United States Patent [19]

Horovitz et al.

[11] Patent Number: 5,735,363
[45] Date of Patent: Apr. 7, 1998

[54] AUXILIARY DRIVE APPARATUS

[75] Inventors: Danny Horovitz, Kfar Tavor; Arie Becker, Jordan Valley, both of Israel

[73] Assignee: S.A.E.Afikim, U.S.A., Inc., Visalia, Calif.

[21] Appl. No.: 513,981

[22] PCT Filed: Mar. 15, 1994

[86] PCT No.: PCT/US94/02815
§ 371 Date: Apr. 11, 1996
§ 102(e) Date: Apr. 11, 1996

[87] PCT Pub. No.: WO94/21509
PCT Pub. Date: Sep. 29, 1994

[30] Foreign Application Priority Data

Mar. 18, 1993 [IL] Israel .......................... 105104

[51] Int. Cl.⁶ .......................................... B62M 7/10
[52] U.S. Cl. .................. 180/205; 180/221; 180/220; 280/212
[58] Field of Search ................... 180/11, 16, 205, 180/206, 220, 221, 222, 65.2, 342, 343, 345, 907, 368; 280/212, 214, 288.4

[56] References Cited

U.S. PATENT DOCUMENTS

| | | |
|---|---|---|
| 3,339,659 | 9/1967 | Wolf .......................... 180/33 |
| 3,891,044 | 6/1975 | Tiede ......................... 180/31 |
| 3,915,250 | 10/1975 | Laden et al. ................ 180/33 D |
| 3,961,678 | 6/1976 | Hirano et al. ............... 180/33 D |
| 4,671,524 | 6/1987 | Haubenwallner ............ 280/212 |
| 5,078,227 | 1/1992 | Becker ....................... 180/221 |

FOREIGN PATENT DOCUMENTS

| | | | |
|---|---|---|---|
| 35 32 993 A1 | 3/1986 | Germany .................. 180/220 |
| 42 19 763 A1 | 12/1993 | Germany .................. 180/220 |
| 2 170 458 | 8/1986 | United Kingdom ........ 180/342 |

Primary Examiner—Kevin Hurley
Attorney, Agent, or Firm—Ladas & Parry

[57] ABSTRACT

Auxiliary drive apparatus including a wheel having an axis of rotation, and first and second wheel engagement elements arranged for driving engagement with the wheel, at least one of the wheel engagement elements being coupled to a motor, for being driven thereby, the first and second of wheel engagement elements being arranged for rotation about respective first and second engagement element rotation axes, the first and second wheel engagement elements being mounted such that the effective traction of the engagement thereof with the wheel increases automatically with increased resistance to rotation of the wheel and decreases automatically with decreased resistance to rotation of the wheel, and wherein a mounting of the first and second wheel engagement elements is such that a separation between the first and second wheel engagement element rotation axes, the separation lying parallel to the axis of rotation of the wheel, is variable.

13 Claims, 21 Drawing Sheets

AUXILIARY DRIVE APPARATUS

The present invention relates to auxiliary drive devices for vehicles, such as bicycles and wheel-chairs as well as to vehicles fitted with such auxiliary drive devices.

A great variety of auxiliary drive devices are known. A particularly successful type of vehicle drive device is described in U.S. Pat. No. 5,078,227, of the present applicant/assignee. Other relevant prior art patents appear in the references cited in that patent.

The present invention seeks to provide an improved auxiliary drive device which automatically adjusts its driving engagement orientation with regard to a driven member, e.g. a tire or wheel, as a function of the instantaneous load, and thus automatically increases and decreases the traction between the drive device and the driven member as required by considerations of driving efficiency and energy efficiency.

For the purposes of the specification and claims, other than where expressly indicated otherwise, the term "wheel" will be employed in a broader than usual sense to include also tires, rims and any other driven rotating element and surfaces thereof.

There is thus provided in accordance with a preferred embodiment of the present invention an auxiliary drive device including first and second wheel engagement elements arranged for driving engagement with a wheel having an axis of rotation, at least one of the wheel engagement elements being coupled to a motor, for being driven thereby, the first and second wheel engagement elements each being arranged for rotation about a respective one of first and second engagement element rotation axes, the first and second wheel engagement elements being mounted such that the effective traction of the engagement thereof with the wheel increases automatically with increased resistance to rotation of the wheel and decreases automatically with decreased resistance to rotation of the wheel.

Preferably the motor is an electrical motor. Alternatively, however, the motor may be any suitable motor, such as a small internal combustion engine, hydraulic engine or pneumatic engine.

In accordance with a preferred embodiment of the present invention, the mounting of the first and second wheel engagement elements is such that the component of the separation between the first and second wheel engagement element rotation axes, which lies parallel to the axis of rotation of the wheel, is variable. Preferably, it decreases automatically with increased resistance to rotation of the wheel and increases automatically with decreased resistance to rotation of the wheel.

In accordance with a preferred embodiment of the present invention, the location at which each of the first and second wheel engagement elements which is driven by a motor engages the wheel tends to move in a direction against the direction of movement of the wheel as resistance to rotation of the wheel increases, and vice versa.

In accordance with a preferred embodiment of the present invention, the engagement element which is driven by a motor is pivotably mounted, together with the motor, about a pivot axis which is generally parallel to the first and second wheel engagement element rotation axes. The non-motor driven engagement element may also be arranged for rotation about the pivot axis.

The term "generally parallel" is used to denote a situation in which substantially parallel orientation is not necessarily required for pivoting to occur.

In accordance with one preferred embodiment of the invention, the motor is mounted on a support bracket, which is, in turn, mounted for pivotal rotation about a pivot axis which is located further from the wheel than the wheel engagement element rotation axis of the corresponding wheel engagement element.

In accordance with an alternative embodiment of the invention, the motor is mounted for pivotal rotation about a pivot axis which is located nearer to the wheel than the wheel engagement element rotation axis of the corresponding wheel engagement element. Preferably, in this case, the motor is provided with an eccentric mounting onto the pivot axis.

In accordance with one embodiment of the invention, both of the wheel engagement elements are motor driven and both are pivotably mounted as described hereinabove. Alternatively, only one of the wheel engagement elements is motor driven. In such a case, the non-motor driven element may be fixed with respect to the motor-driven element and is pivotably mounted together therewith. Otherwise, the non-motor driven element rotation axis may be fixed.

In accordance with a preferred embodiment of the present invention, the first and second wheel engagement elements are coupled by gearing. In accordance with a preferred embodiment of the present invention the first and second wheel engagement elements are also pivotably mounted about a pivot axis which lies in or parallel to the plane of the wheel. This feature is effective for balancing the forces on opposite sides of the wheel exerted by the auxiliary drive apparatus, when the wheel is not driven by identical motors on both sides thereof, and for taking into account eccentricities of the wheel.

BRIEF DESCRIPTION OF THE DRAWINGS

The present invention will be understood and appreciated more fully from the following detailed description, taken in conjunction with the drawings in which.

Figure 1A:
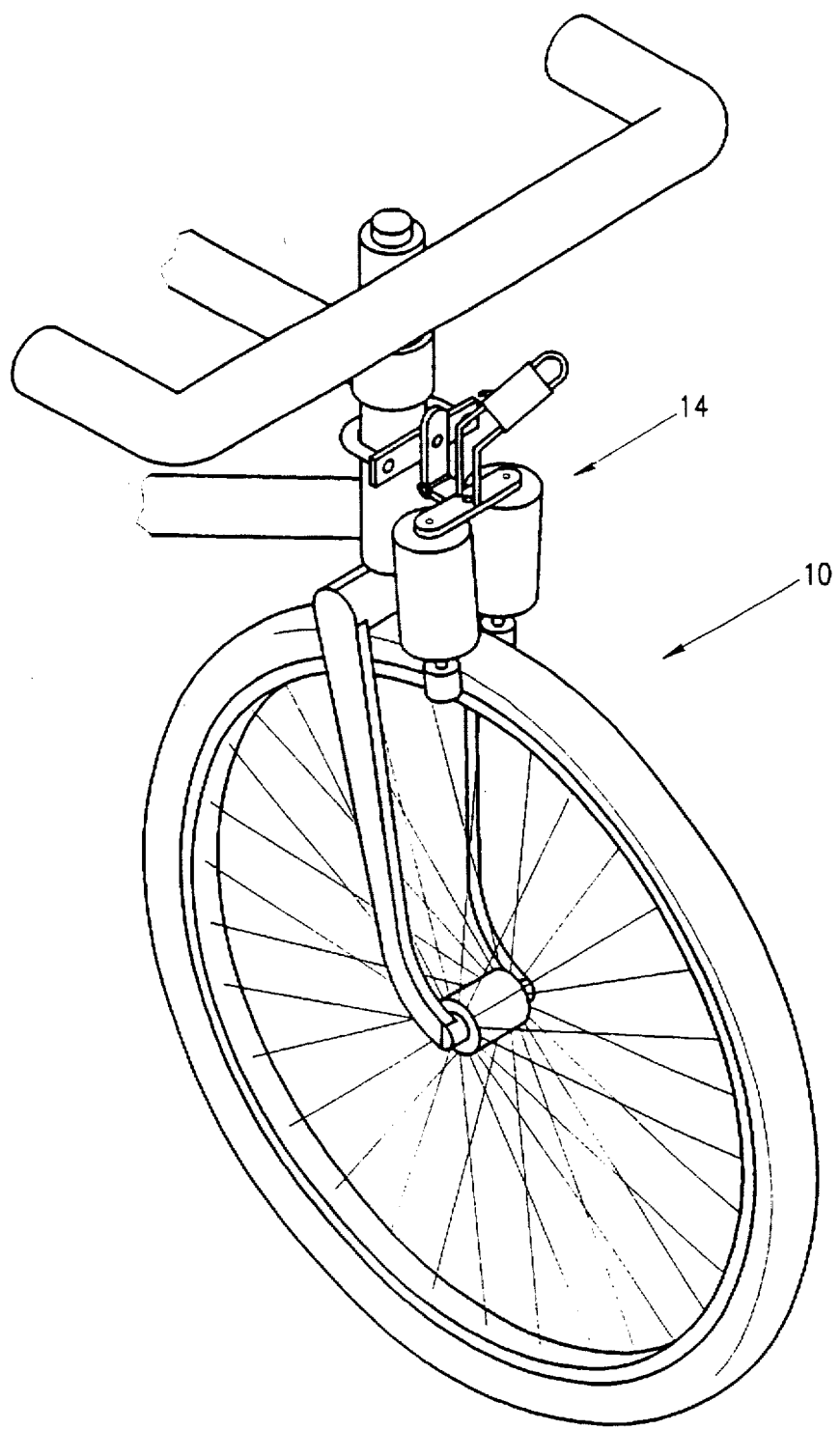
FIGS. 1A and 1B are pictorial illustrations of two exemplary applications of auxiliary drive apparatus constructed and operative in accordance with a preferred embodiment of the present invention.
Figure 1B:
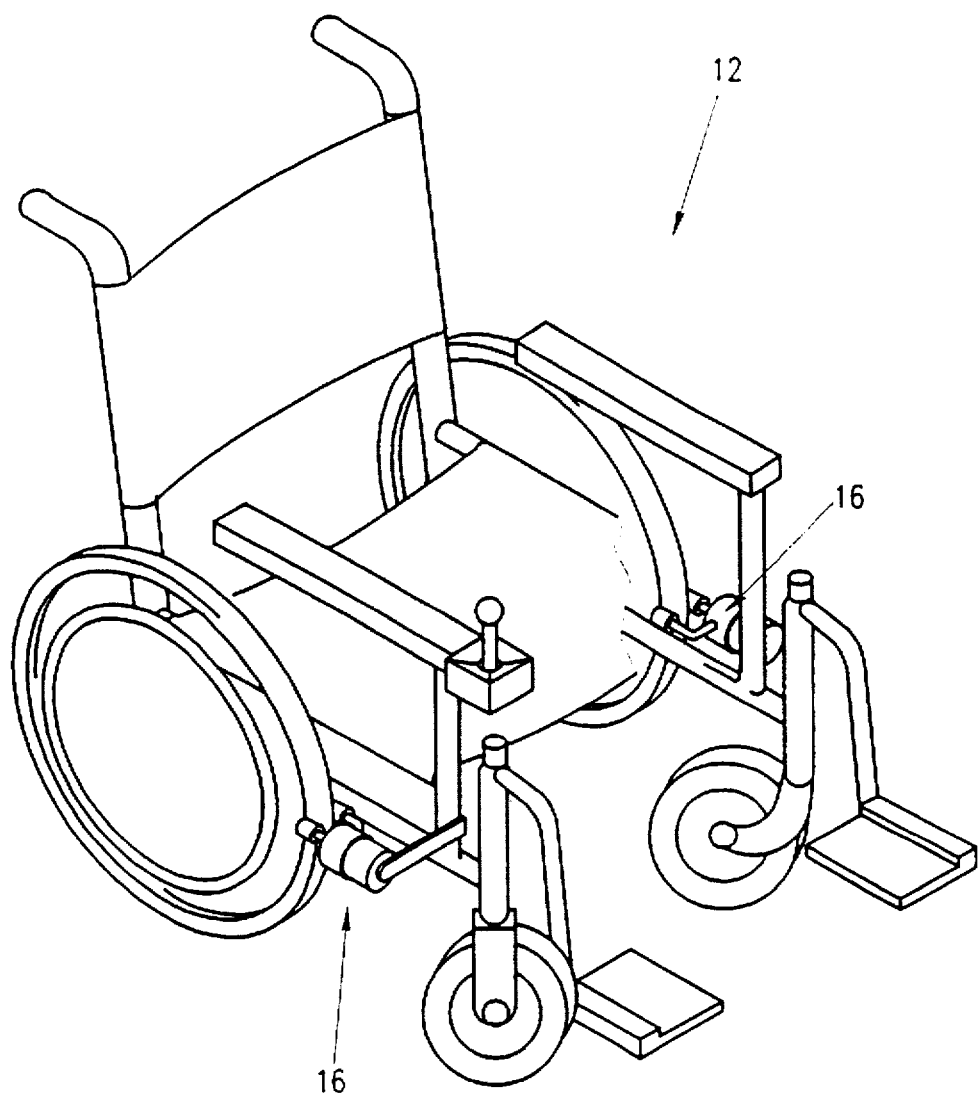

Reference is now made to FIGS. 1A and 1B, which illustrate respectively part of a bicycle 10 and a wheelchair 12, each including auxiliary drive apparatus, respectively designated 14 and 16, in accordance with a preferred embodiment of the invention. It is to be appreciated that the invention is not limited to bicycles and wheelchairs and auxiliary drive apparatus therefor, but instead, the invention is applicable to any suitable type of vehicle which is capable of being powered or assisted by auxiliary drive apparatus which drivingly engages one or more wheels thereof.

Figure 1C:
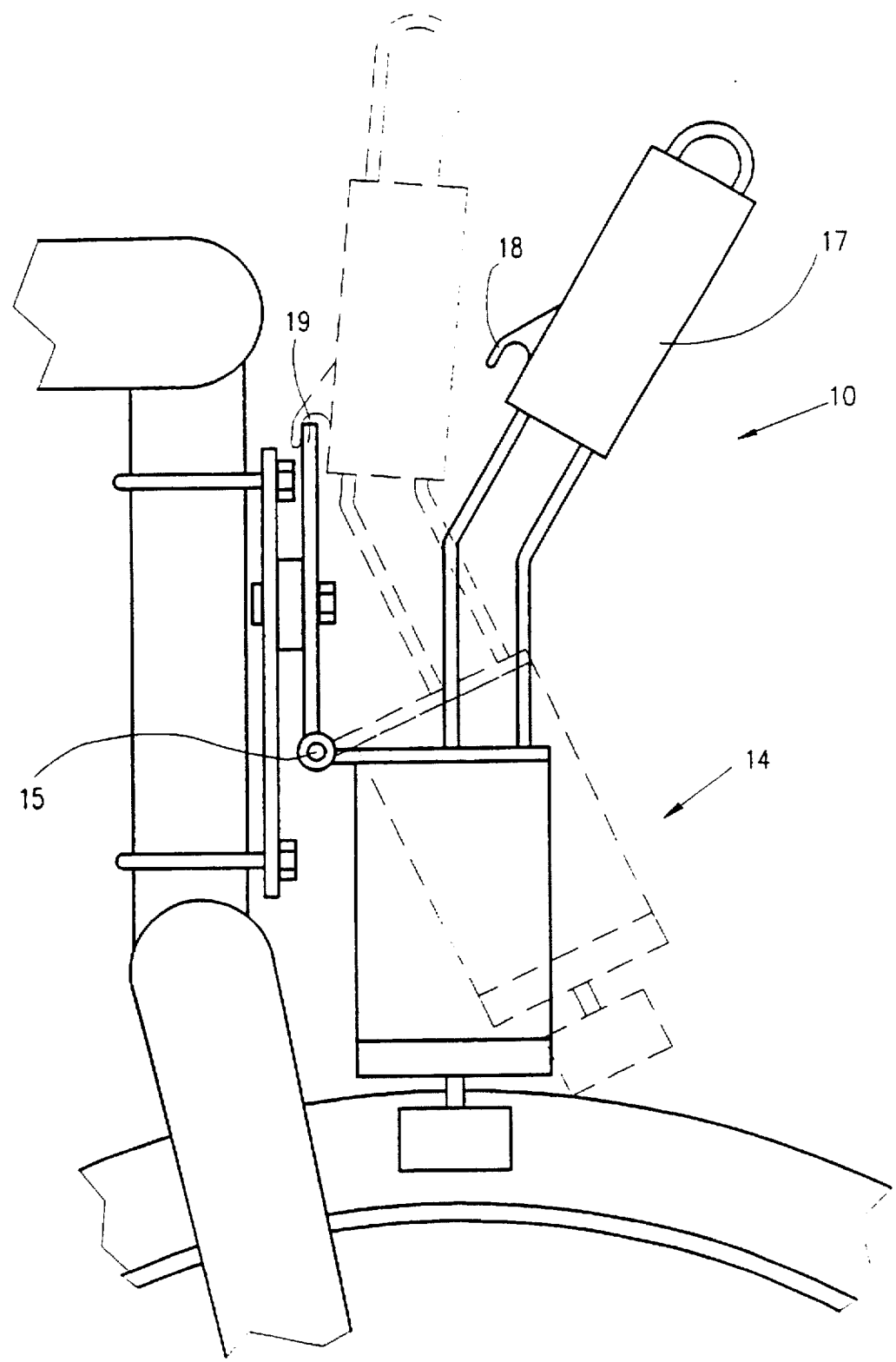
FIG. 1C is a schematic illustration of the operation of the apparatus of FIG. 1A.

FIG. 1C illustrates in greater detail the auxiliary drive apparatus 14 of FIG. 1 and indicates that it is manually pivotable about a pivot axis 15 between a wheel engaging orientation illustrated in solid lines and a disengaged orientation illustrated in phantom. A slidable handle element 17 serves to retain the apparatus 14 in its disengaged orientation by means of an integrally formed hook 18 which removably engages the edge of a mounting member 19 as shown.

Figure 2:
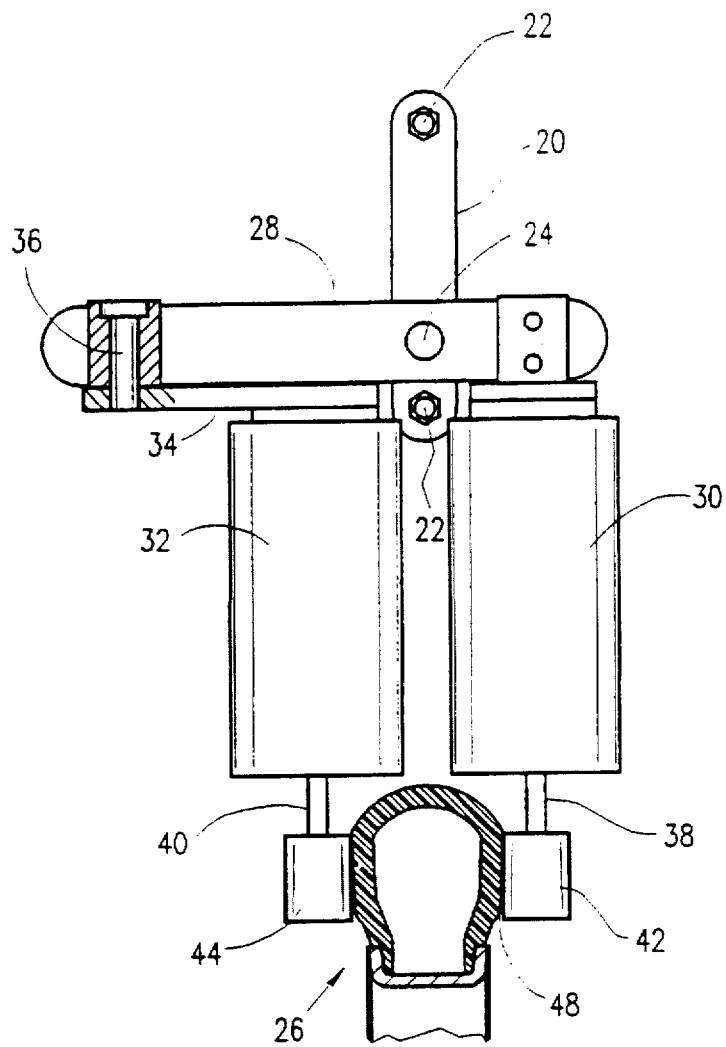
FIG. 2 is a partially cut away pictorial view of auxiliary drive apparatus constructed and operative in accordance with a preferred embodiment of the present invention in operative engagement with a wheel.
Figure 3A:
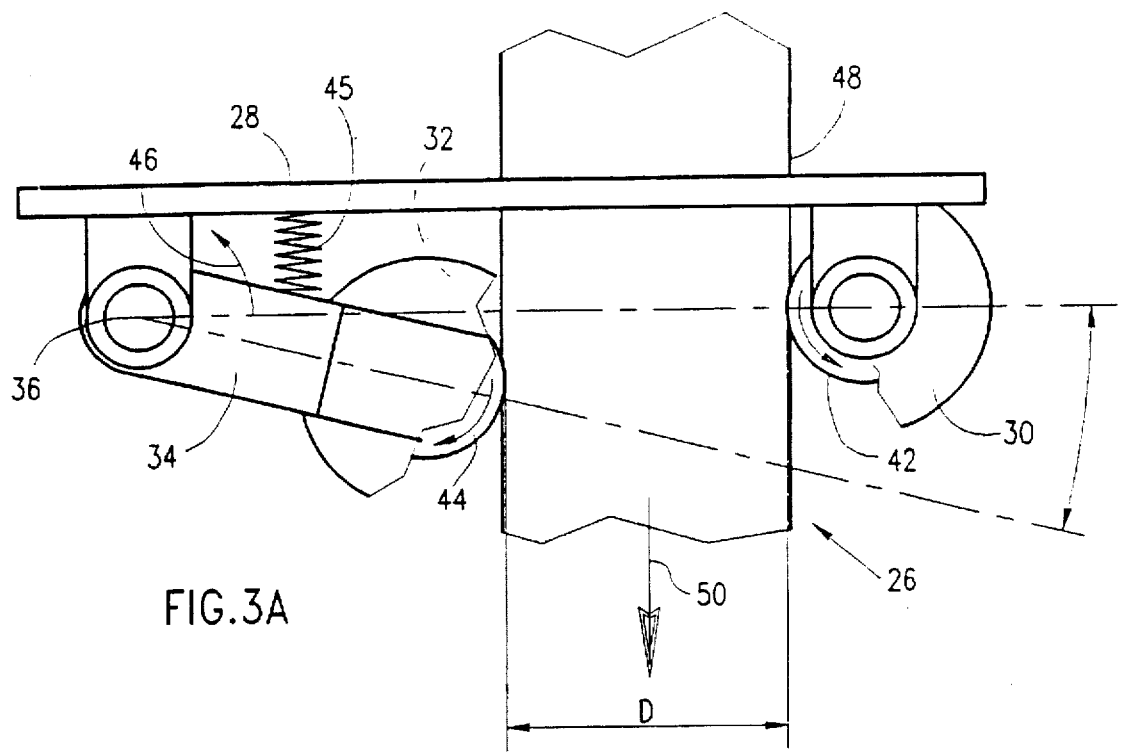
FIGS. 3A and 3B are simplified pictorial illustrations of the operation of the apparatus of FIG. 2 in respective low load and high load situations.
Figure 3B:
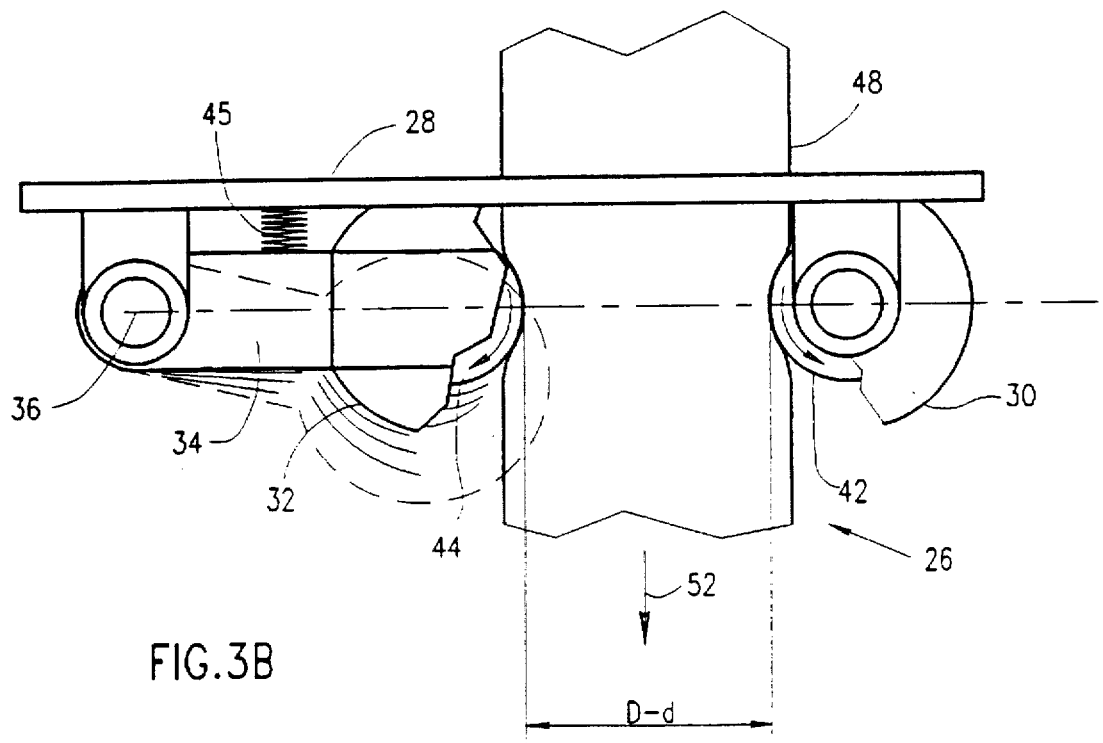

Reference is now made to FIGS. 2, 3A and 3B, which illustrate a preferred embodiment of the present invention and the operation thereof, designed for application to a bicycle. A support bracket 20 is integrally formed with or fixed to a bicycle frame, as by bolts 22. A base element 28 is pivotably mounted onto support bracket 20 for rotation about a pivot axis 24, which preferably lies in the plane of a bicycle wheel 26, having an axis of rotation (not shown) perpendicular to pivot axis 24 and parallel to the plane of the drawing.

It is to be appreciated that the pivotal mounting of base element 28 about pivot axis 24 is intended to permit the auxiliary drive apparatus of the present invention to move such as to take into account eccentricities of the bicycle wheel 26. This pivotal mounting is also effective for balancing the forces exerted on opposite sides of the wheel by the auxiliary drive apparatus.

A first electric motor 30 is fixedly mounted onto base element 28 and a second electric motor 32 is fixedly mounted onto a pivoting bracket 34, which is in turn pivotably mounted onto base element 28 about a pivot axis 36. Pivot axis 36 is preferably perpendicular to and laterally offset from pivot axis 24 and lies on the other side of motor 32 from pivot axis 24.

Motors 30 and 32 have respective output shafts 38 and 40, onto which are mounted wheel engagement elements 42 and 44 respectively. Pivoting bracket 34 is preferably urged by a spring 45 in direction indicated by an arrow 46, thus urging wheel engagement element 44 into frictional driving engagement with the vehicle wheel.

Preferably, in the illustrated embodiment, the wheel engagement elements 42 and 44 are generally cylindrical rollers having high friction outer surfaces. Preferably, during steady state cruising operation of the bicycle driven by motors 30 and 32, the arrangement of the wheel engagement elements 42 and 44 is generally as illustrated in FIG. 3A, wherein the wheel engagement elements 42 and 44 both deform the sides of the tire 48 and the relative linear velocity of the wheel is indicated by an arrow 50.

It is a particular feature of the present invention that when an increased load is applied to the wheel 26, impeding forward driven rotation of the wheel and causing its linear velocity to decrease as indicated by arrow 52, the motor driven rotation of the wheel engagement element 44 in frictional engagement with the wheel 26 causes it automatically to move into stronger frictional engagement with the wheel 26. In the illustrated embodiment, this is accomplished automatically by rotation of bracket 34 about pivot axis 36 in a direction indicate a by arrow 46.

It is appreciated that a similar operation of the invention will occur when the motor speed is increased, thus providing an increase surface velocity of the driven wheel engagement element, and for any reason, the corresponding surface velocity of the wheel 26 in engagement therewith does not increase correspondingly. This will normally occur over a short period immediately following the increase in motor speed.

Thus, it is appreciated that increased traction is provided in accordance with the present invention whenever the surface velocity of the driven wheel engagement element is greater than the corresponding surface velocity of the wheel 26 in engagement therewith.

As seen in FIG. 3B, this rotation about axis 36 brings the wheel engagement elements 42 and 44 closer to each other in a direction parallel to the axis of rotation of wheel 26, thus increasing the squeezing force on the tire 48 and the traction between the motors 30 and 32 and the wheel 26.

The rotation about axis 36 has the effect of causing the component of the separation between the first and second wheel engagement element rotation axes, i.e. of shafts 38 and 40, which lies parallel to the axis of rotation of the wheel 26, to decrease automatically with increased resistance to rotation of the wheel and increase automatically with decreased resistance to rotation of the wheel.

The change in separation is clearly seen by comparing the perpendicular distance D between elements 42 and 44 in FIG. 3A with the perpendicular distance D–d in FIG. 3B. By virtue of the pivotal mounting of bracket 28 about pivot axis 24, the forces exerted on both sides of the wheel by elements 42 and 44 are generally equal.

As a result, increased traction and increased power is provided automatically in self-regulating manner, when such traction and power is needed and only when needed.

Figure 4:
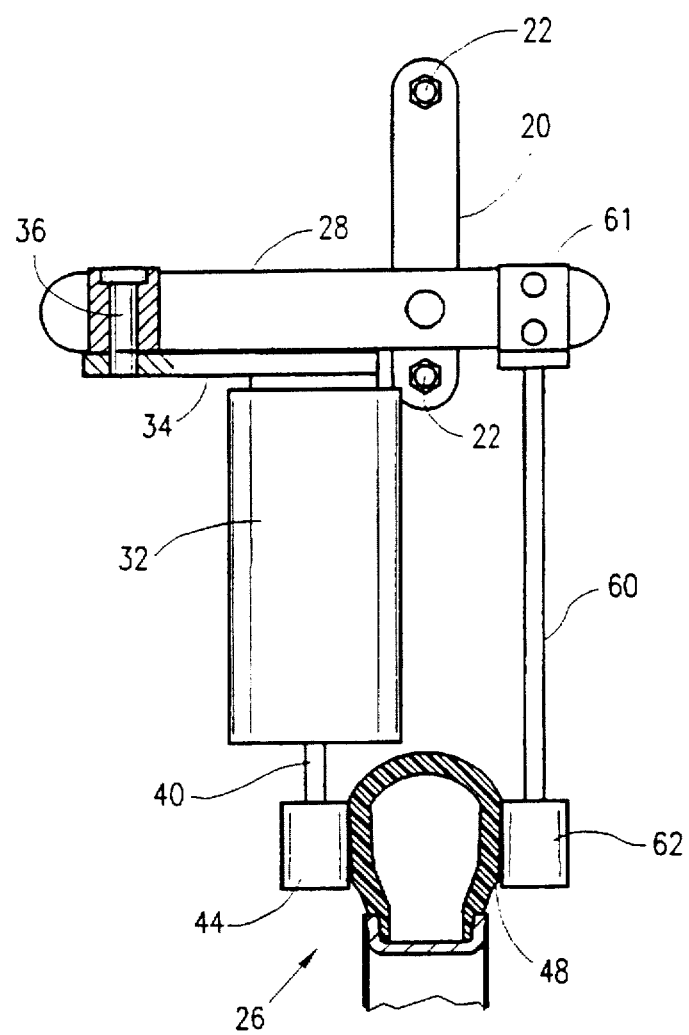
FIG. 4 is a partially cut away pictorial view of auxiliary drive apparatus constructed and operative in accordance with another preferred embodiment of the present invention in operative angagement with a wheel.
Figure 5A:
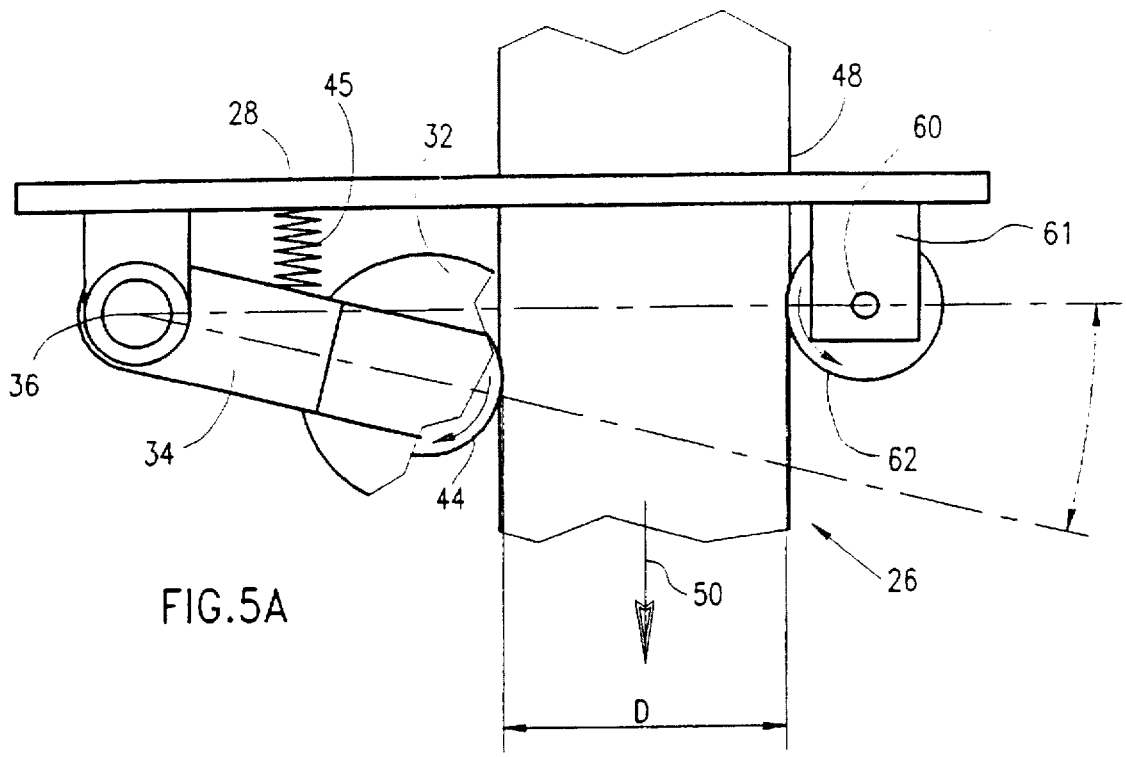
FIGS. 5A and 5B are simplified pictorial illustrations of the operation of the apparatus of FIG. 4 in respective low load and high load situations.
Figure 5B:
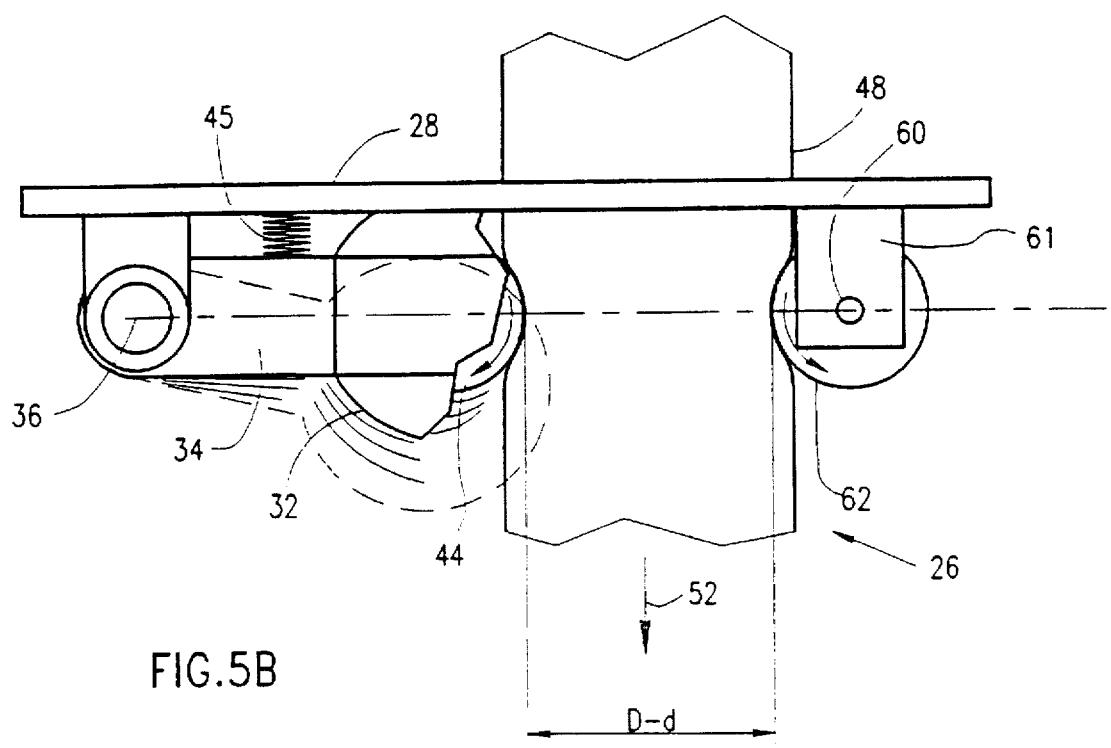

Reference is now made to FIGS. 4, 5A and 5B which show a structure similar to that of FIGS. 2, 3A and 3B, wherein motor 30 is eliminated and replaced by a shaft 60, fixed onto base member 28 by means of a bracket 61 and driven wheel engagement element 42 is replaced by a dummy non-driven wheel engagement element 62 which is rotatably mounted on shaft 60. As can be seen from a consideration of FIGS. 5A and 5B, the operation of the apparatus of FIGS. 4, 5A and 5B is identical to that of the apparatus of FIGS. 2, 3A and 3B, other than in that only a single motor drive is provided. By virtue of the pivotal mounting of bracket 28 about pivot axis 24, the forces exerted on both sides of the wheel by elements 42 and 44 are generally equal.

Here, also, the change in separation is clearly seen by comparing the perpendicular distance D between elements 62 and 44 in FIG. 5A with the perpendicular distance D–d in FIG. 5B.

Figure 6:
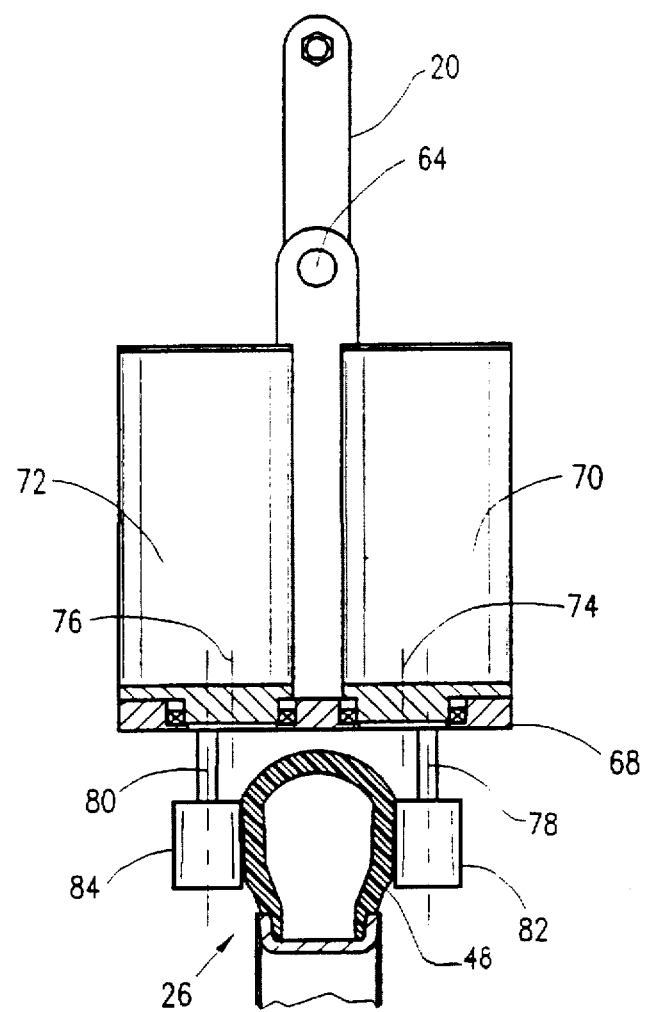
FIG. 6 is a partially cut away pictorial view of auxiliary drive apparatus constructed and operative in accordance with still another preferred embodiment of the present invention in operative engagement with a wheel.
Figure 7A:
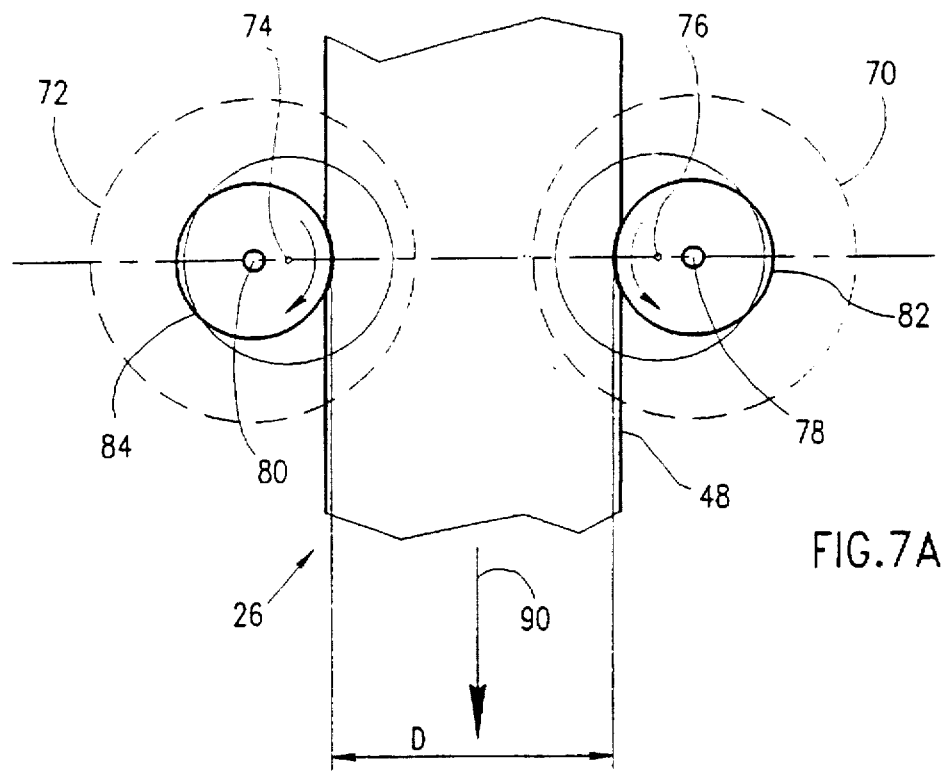
FIGS. 7A and 7B are simplified pictorial illustrations of the operation of the apparatus of FIG. 6 in respective low load and high load situations.
Figure 7B:
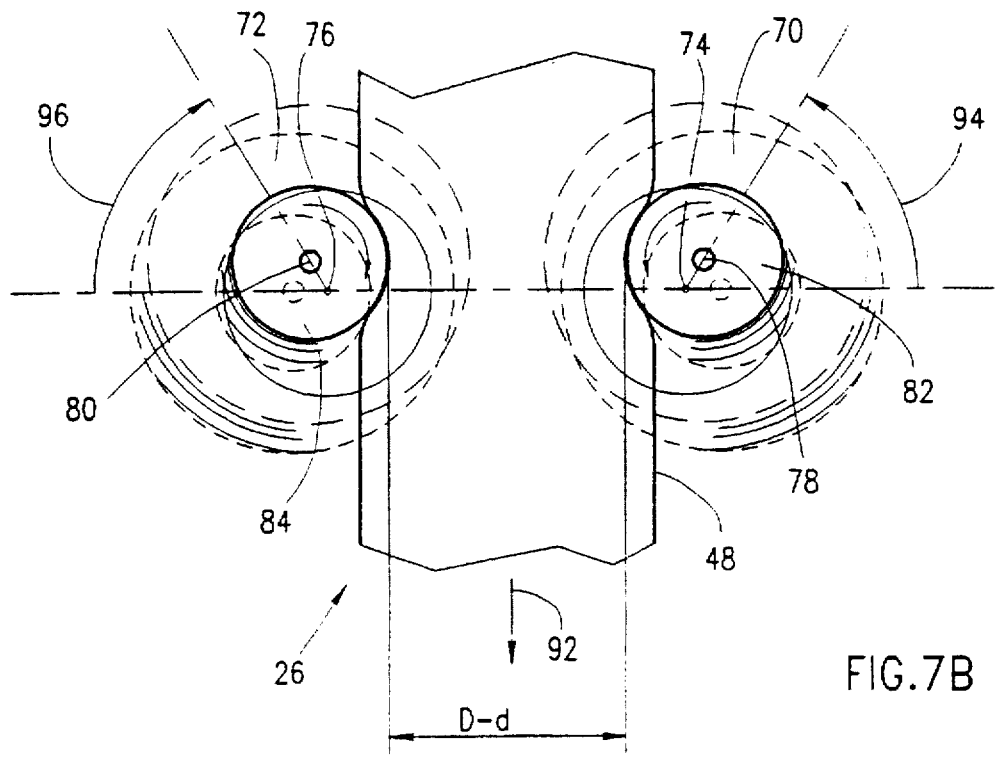

Reference is now made to FIGS. 6, 7A and 7B which show a structure similar to that of FIGS. 2, 3A and 3B, but wherein pivot bracket 34 is eliminated and a pair of motors 70 and 72 are each pivotably and eccentrically mounted onto a base member 68, which is in turn pivotably mounted about a pivot axis 64 onto support bracket 20.

In the illustrated embodiment of FIGS. 6, 7A and 7B, motors 70 and 72 are pivotably mounted onto base member 68 about respective pivot axes 74 and 76 which are typically parallel. Preferably, pivot axes 74 and 76 are perpendicular to pivot axis 64 and lie in a plane generally parallel to or coplanar with a plane in which lies the axis of rotation of the wheel 26.

Motors 70 and 72 have respective output shafts 78 and 80, onto which are mounted wheel engagement elements 82 and 84 respectively, of generally cylindrical configuration. It is a particular feature of this embodiment that wheel engagement element rotation axes defined by shafts 78 and 80 are not coaxial with pivot axes 74 and 76, although they are generally parallel thereto. This eccentric mounting relationship provides an automatic traction adjustment feature similar to that provided by the mounting arrangement of FIGS. 2, 3A and 3B.

Preferably, in the illustrated embodiment, the wheel engagement elements 82 and 84 are generally cylindrical rollers having high friction outer surfaces which frictionally and drivingly engage wheel 26. Alternatively, pivot axes 74 and 76 may be selected to be non-parallel. In such a case, conical rollers are used instead.

During steady state cruising operation of the bicycle driven by motors 70 and 72, the arrangement of the wheel engagement elements 82 and 84 is generally as illustrated in FIG. 7A, wherein the wheel engagement elements 82 and 84 both deform the sides of the tire 48 and the relative linear velocity of the wheel is indicated by an arrow 90.

It is a particular feature of the present invention that when an increased load is applied to the wheel 26, impeding forward driven rotation of the wheel and causing its linear velocity to decrease as indicated by arrow 92, the motor driven rotation of the wheel engagement elements 82 and 84 in frictional engagement with the wheel 26 causes them to automatically move into stronger frictional engagement with the wheel 26. In the illustrated embodiment, this is accomplished automatically by rotation of each of motors 70 and 72 about respective pivot axes 74 and 76 in directions indicated by arrows 94 and 96 respectively.

As seen in FIG. 7B, this rotation brings the wheel engagement elements 82 and 84 closer together, thus increasing the squeezing force on the tire 48 and the traction between the motors 70 and 72 and the wheel 26. This rotation has the effect of causing the component of the separation between the first and second wheel engagement element rotation axes, i.e. of shafts 78 and 80, which lies parallel to the axis of rotation of the wheel, to decrease automatically with increased resistance to rotation of the wheel and increase automatically with decreased resistance to rotation of the wheel.

Figure 8:
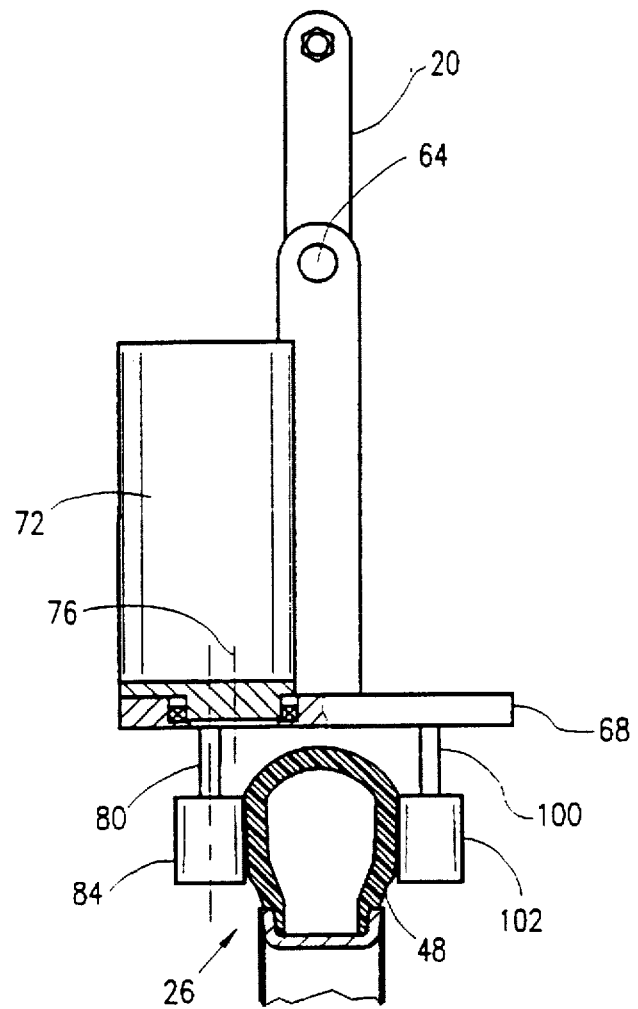
FIG. 8 is a partially cut away pictorial view of auxiliary drive apparatus constructed and operative in accordance with yet another preferred embodiment of the present invention in operative engagement with a wheel.
Figure 9A:
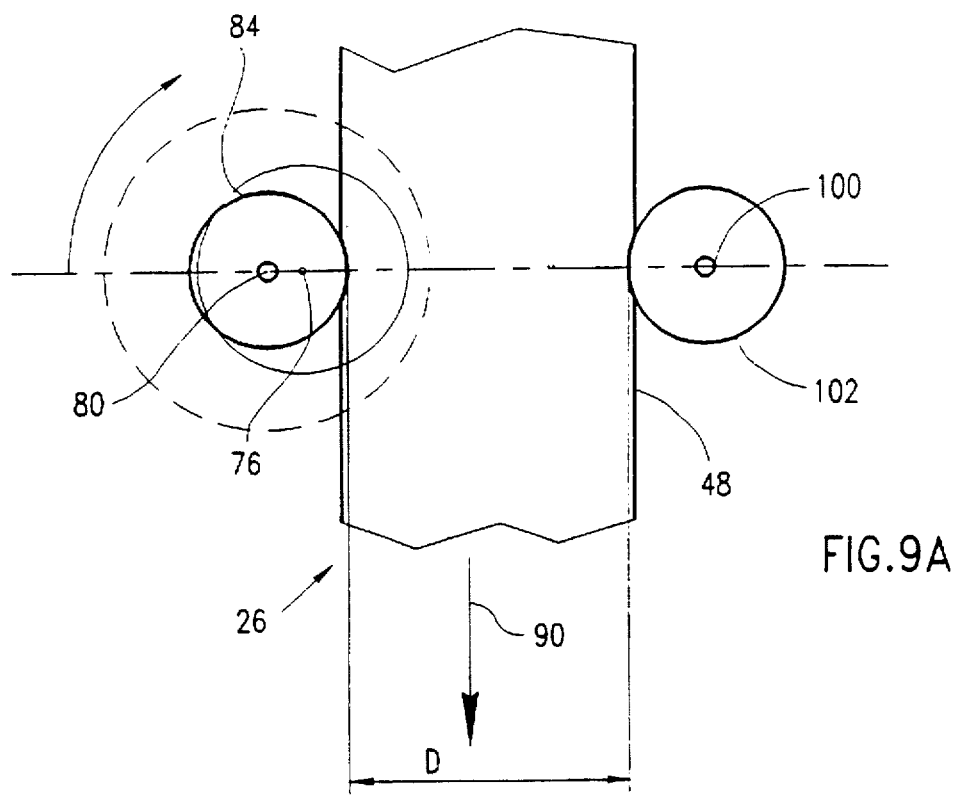
FIGS. 9A and 9B are simplified pictorial illustrations of the operation of the apparatus of FIG. 8 respective low load and high load situations.
Figure 9B:
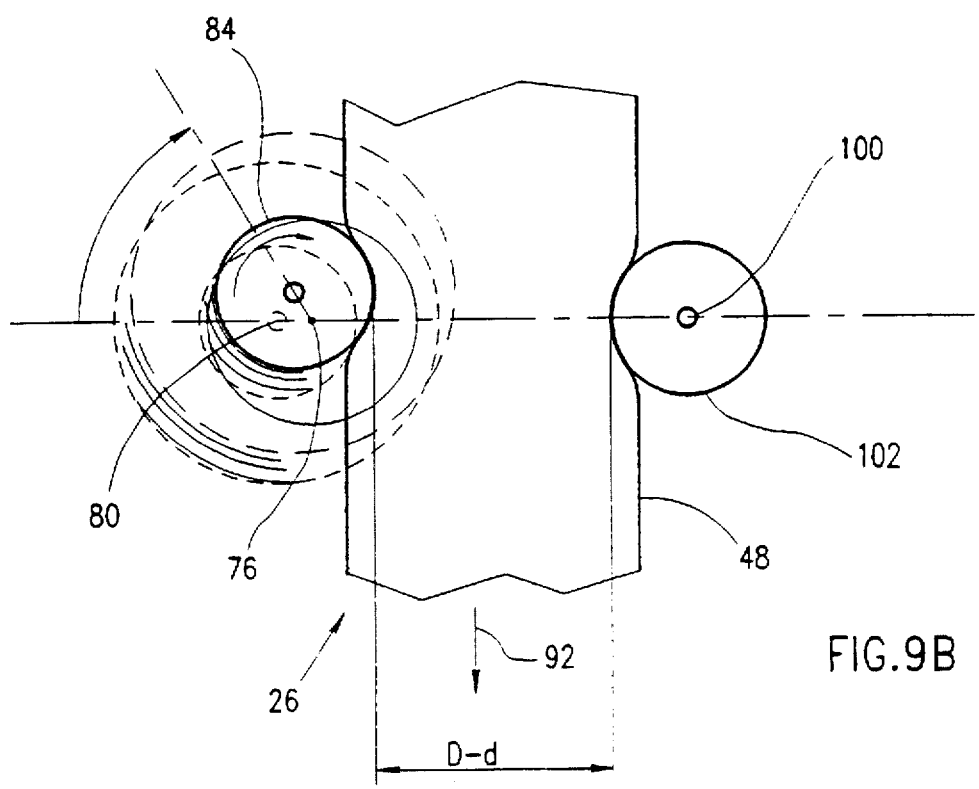

As a result, increased traction and increased power is provided automatically in self-regulating manner, when such traction and power is needed and only when needed. Reference is now made to FIGS. 8, 9A and 9B which show a structure similar to that of FIGS. 6, 7A and 7B, wherein motor 70 is eliminated and replaced by a shaft 100, fixed onto base member 68, and driven wheel engagement element 82 is replaced by a dummy non-driven wheel engagement element 102 which is rotatably mounted on shaft 100. As can be seen from a consideration of FIGS. 9A and 9B, the operation of the apparatus of FIGS. 8, 9A and 9B is identical to that of the apparatus of FIGS. 6, 7A and 7B, other than in that only a single motor drive is provided and that the position of wheel engagement element 102 does not change. By virtue of the pivotal mounting of base member 68 about pivot axis 64, the forces exerted on both sides of the wheel by elements 82 and 84 are generally equal.

Figure 10:
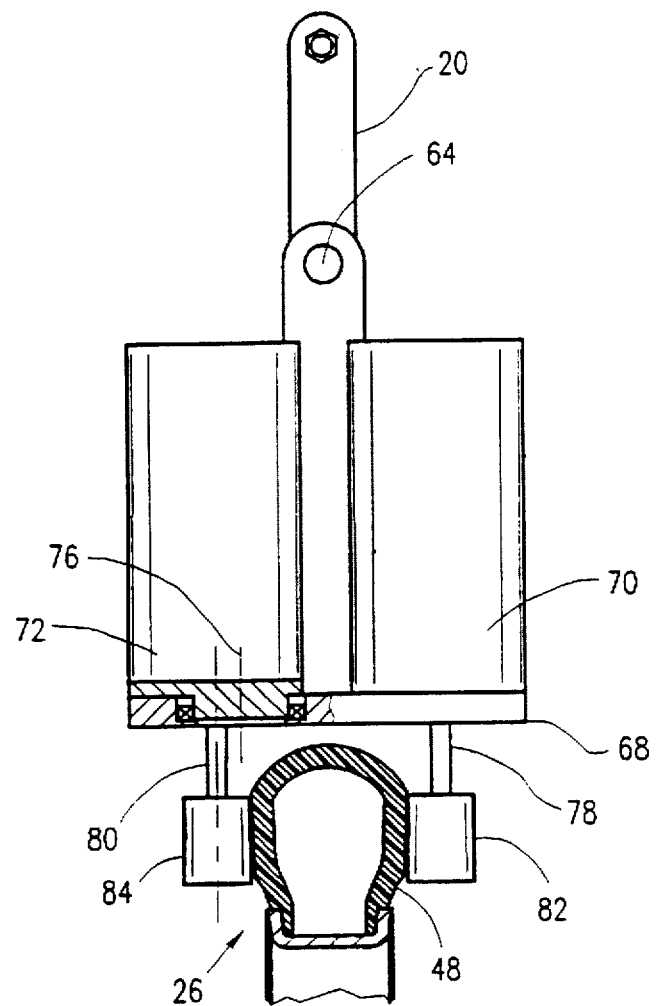
FIG. 10 is a partially cut away pictorial view of auxiliary drive apparatus constructed and operative in accordance with a further preferred embodiment of the present invention in operative engagement with a wheel.
Figure 11A:
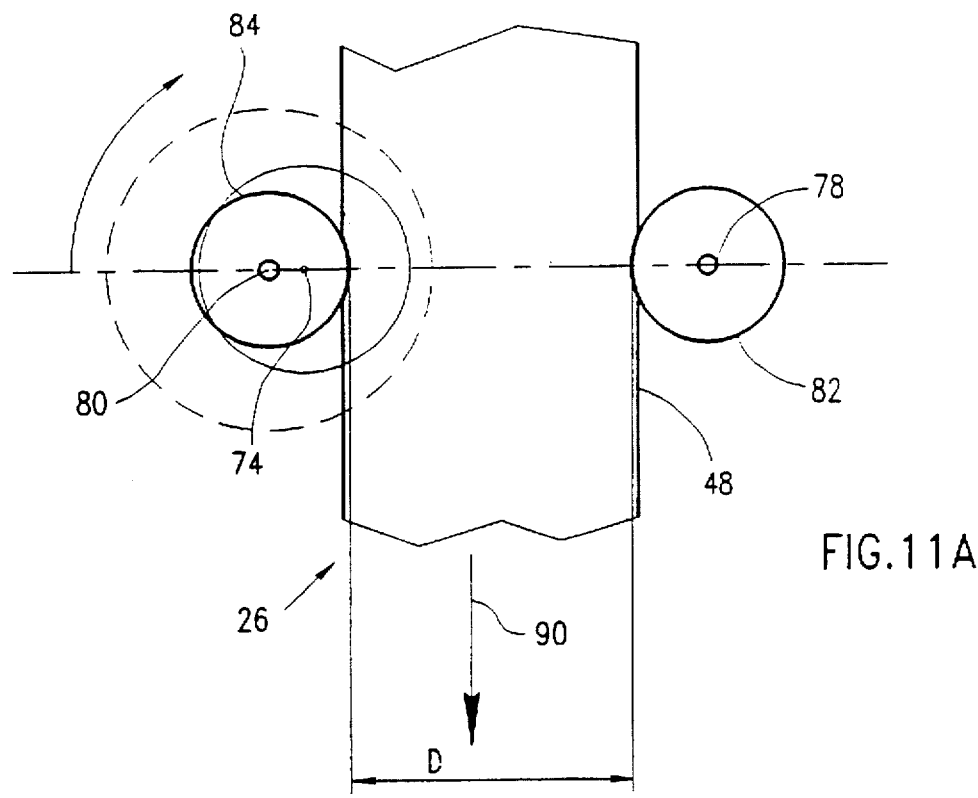
FIGS. 11A and 11B are simplified pictorial illustrations of the operation of the apparatus of FIG. 10 in respective low load and high load situations.
Figure 11B:
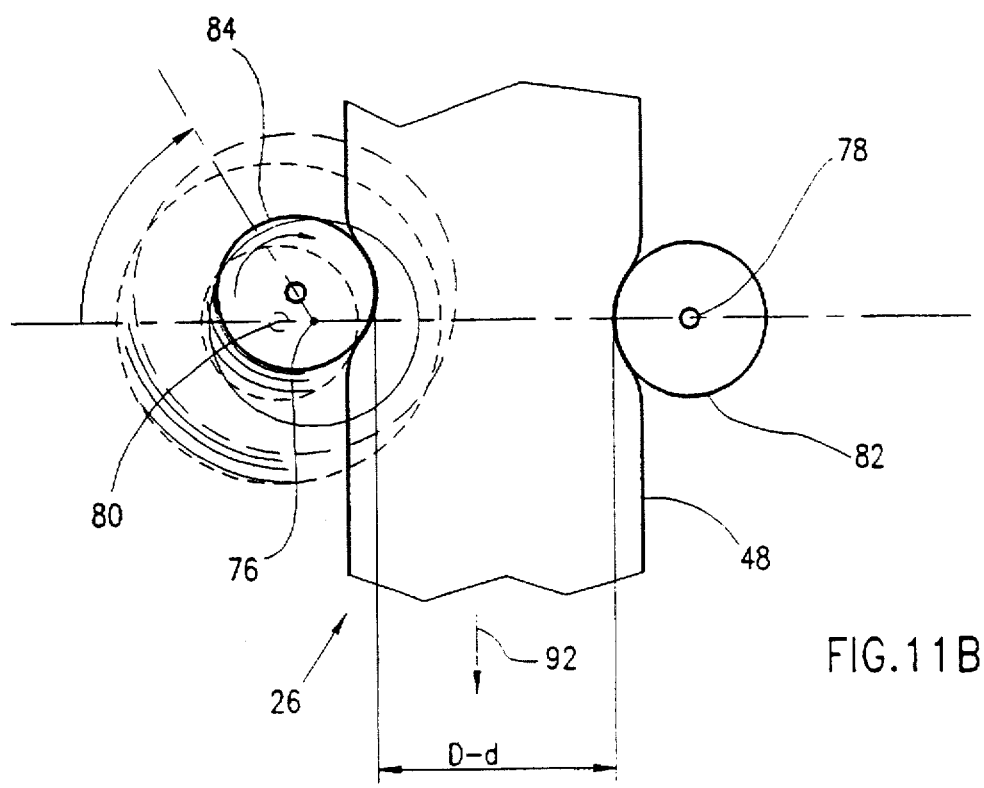

Reference is now made to FIGS. 10, 11A and 11B, which show a structure similar to that of FIGS. 6, 7A and 7B, wherein motor 70 is fixed, rather than pivotably mounted, onto base member 68. As can be seen from a consideration of FIGS. 11A and 11B, the operation of the apparatus of FIGS. 10, 11A and 11B is identical to that of the apparatus of FIGS. 6, 7A and 7B, other than in that the position of wheel engagement element 82 does not change.

By virtue of the pivotal mounting of base member 68 about pivot axis 64, the forces exerted on both sides of the wheel by elements 82 and 84 are generally equal.

Here, also, the change in separation is clearly seen by comparing the perpendicular distance D between elements 82 and 84 in FIG. 7A with the perpendicular distance D–d in FIG. 7B.

Reference is now made to FIGS. 12, 13, 14A and 14B, which illustrate a single motor auxiliary drive structure in which a motor 130 is pivotably mounted by bracket 132, onto an intermediate bracket 133, which is pivotably mounted about a pivot axis 134 onto a support bracket 135 which is fixed to a bicycle frame, as by bolts 136. The pivotable mounting pivot axis 134 is intended to permit the auxiliary drive apparatus of the present invention to move such as to take into account eccentricities of the bicycle wheel 26 and to equalize the forces applied to opposite sides of the wheel 26.

Motor 130 is provided with an output shaft 140, which is connected to a gear 142. Gear 142 engages a gear 144, which is in turn coupled to a wheel engagement element 146 via a drive shaft 148. Output shaft 140 is also coupled directly to a wheel engagement element 150. Gears 142 and 144 are enclosed in a housing 152 which is rotatable about the axis of shaft 140.

Figure 13:
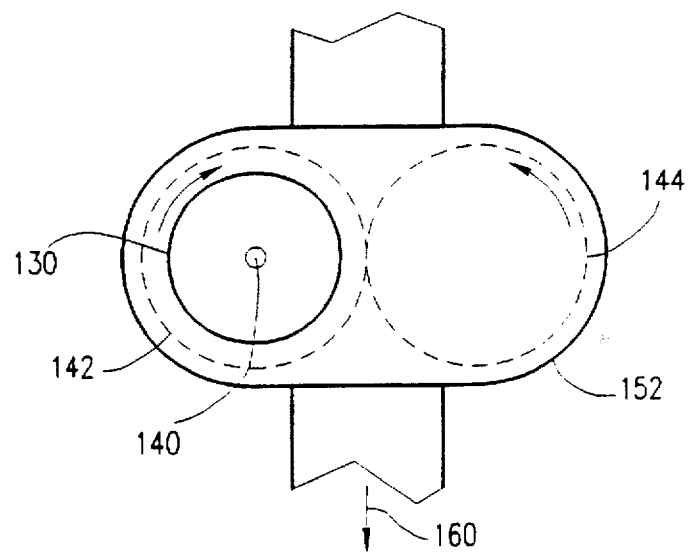
FIG. 13 is a simplified illustration taken along the lines XIII—XIII in FIG. 12.
Figure 12:
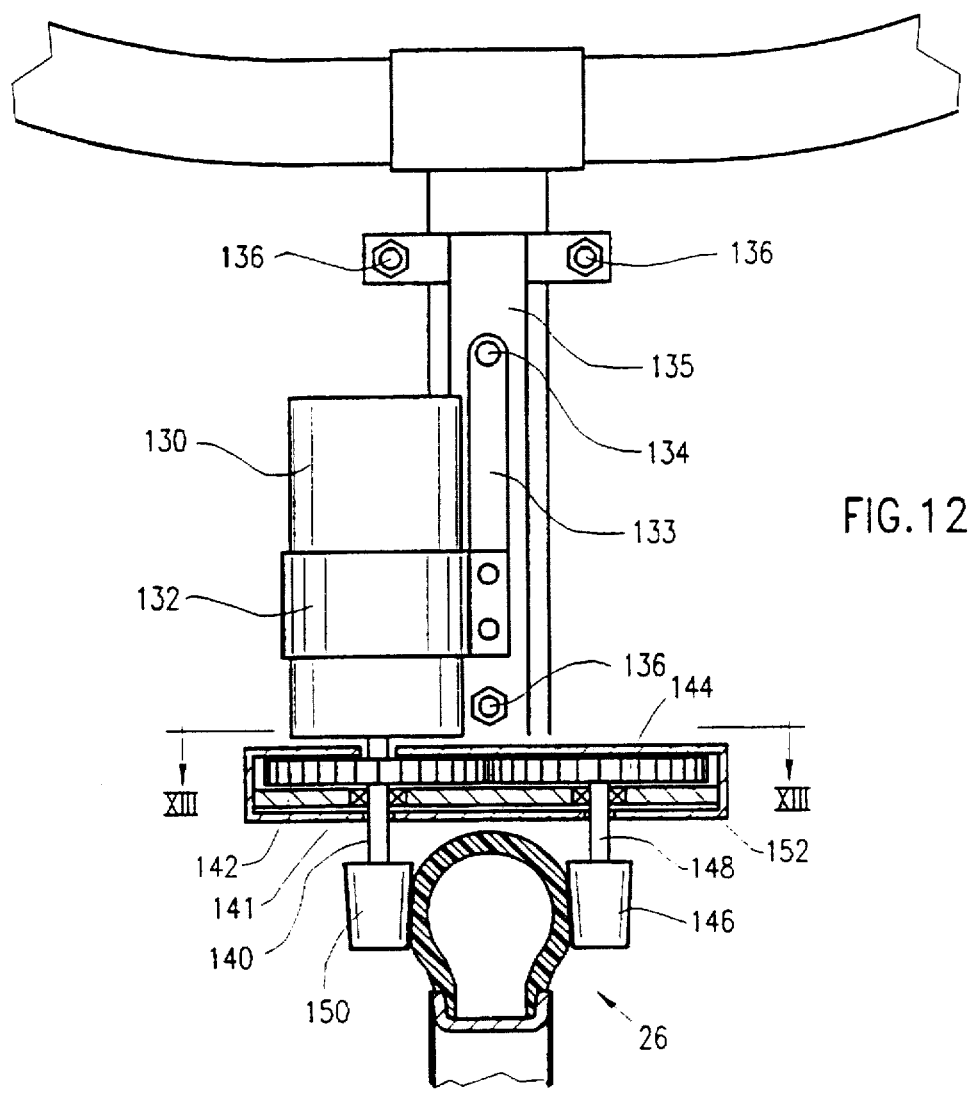
FIG. 12 is a partially cut away pictorial view of auxiliary drive apparatus constructed and operative in accordance with a preferred embodiment of the present invention in operative engagement with a wheel.
Figure 14A:
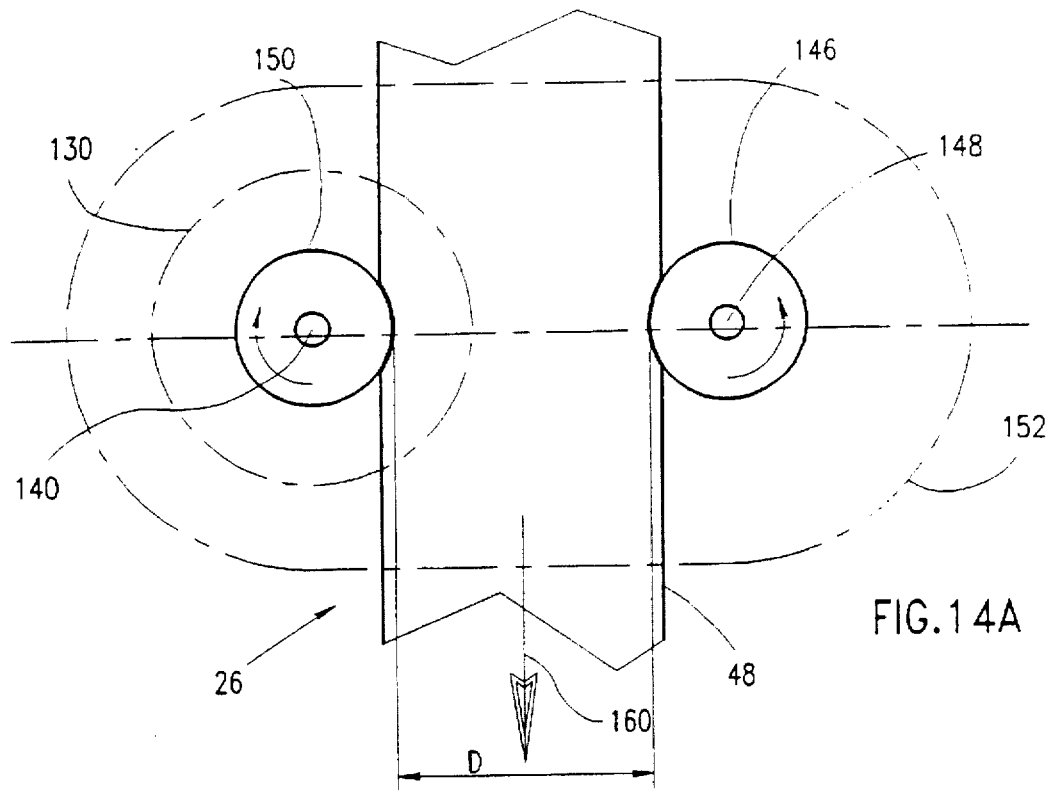
FIGS. 14A and 14B are simplified pictorial illustrations of the operation of the apparatus of FIGS. 12 and 13 in respective low load and high load situations.

From a consideration of FIGS. 13 and 14A, it is appreciated that wheel engagement elements 146 and 150 rotate in opposite directions in contact with opposite side surfaces of wheel 26 and thus both participate in driving the wheel in a direction indicated by an arrow 160.

Preferably, in the illustrated embodiment, the wheel engagement elements 146 and 150 are generally cylindrical rollers having high friction outer surfaces. Preferably, during steady state cruising operation of the bicycle driven by motor 130, the arrangement of the wheel engagement elements 146 and 150 is generally as illustrated in FIG. 14A, wherein the wheel engagement elements 146 and 150 both deform the sides of the tire 48 and the relative linear velocity of the wheel is indicated by arrow 160.

Figure 14B:
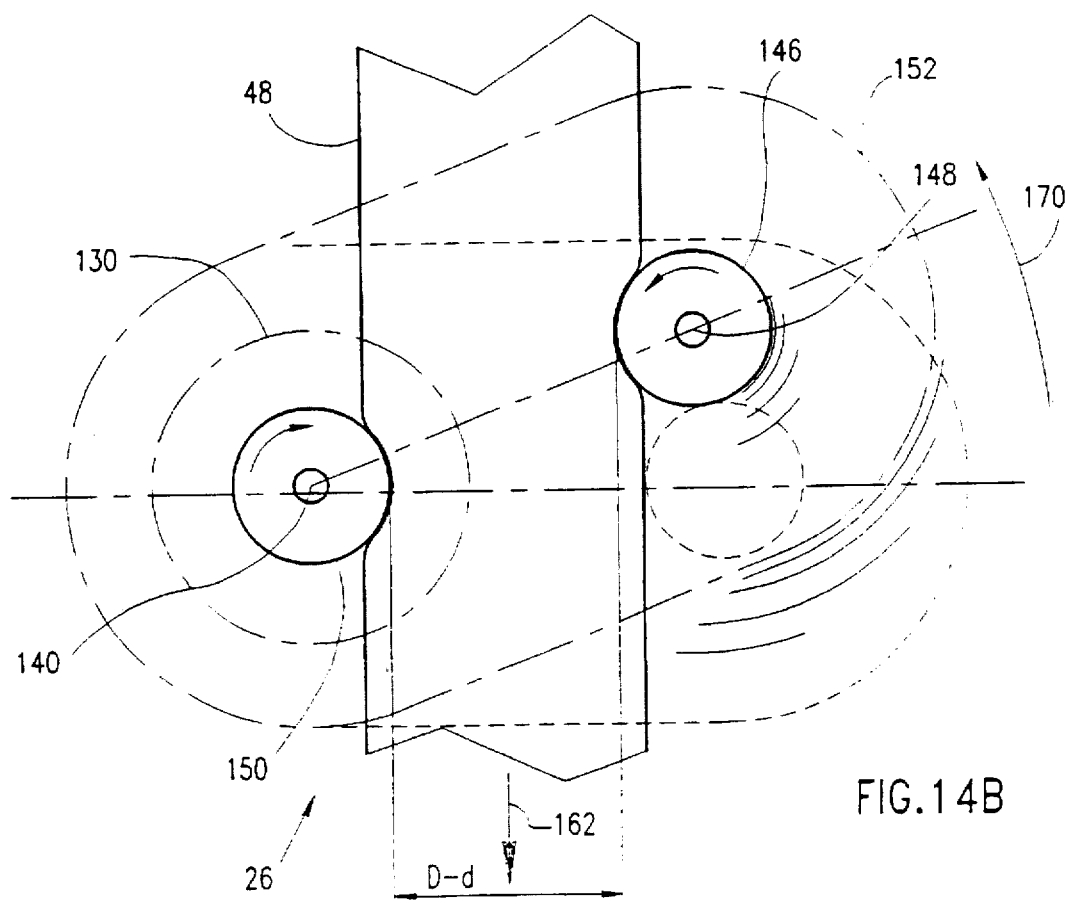
Figure 15B:
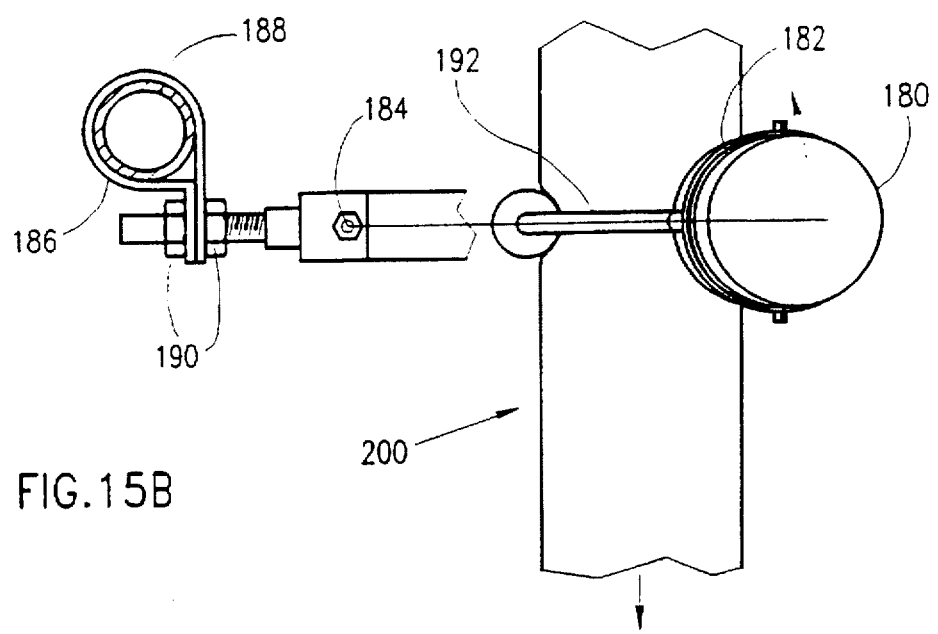
FIGS. 15A and 15B are respective partially cut away side view and top view illustrations of auxiliary drive apparatus constructed and operative in accordance with still a further preferred embodiment of the present invention in operative engagement with a wheel.
Figure 15A:
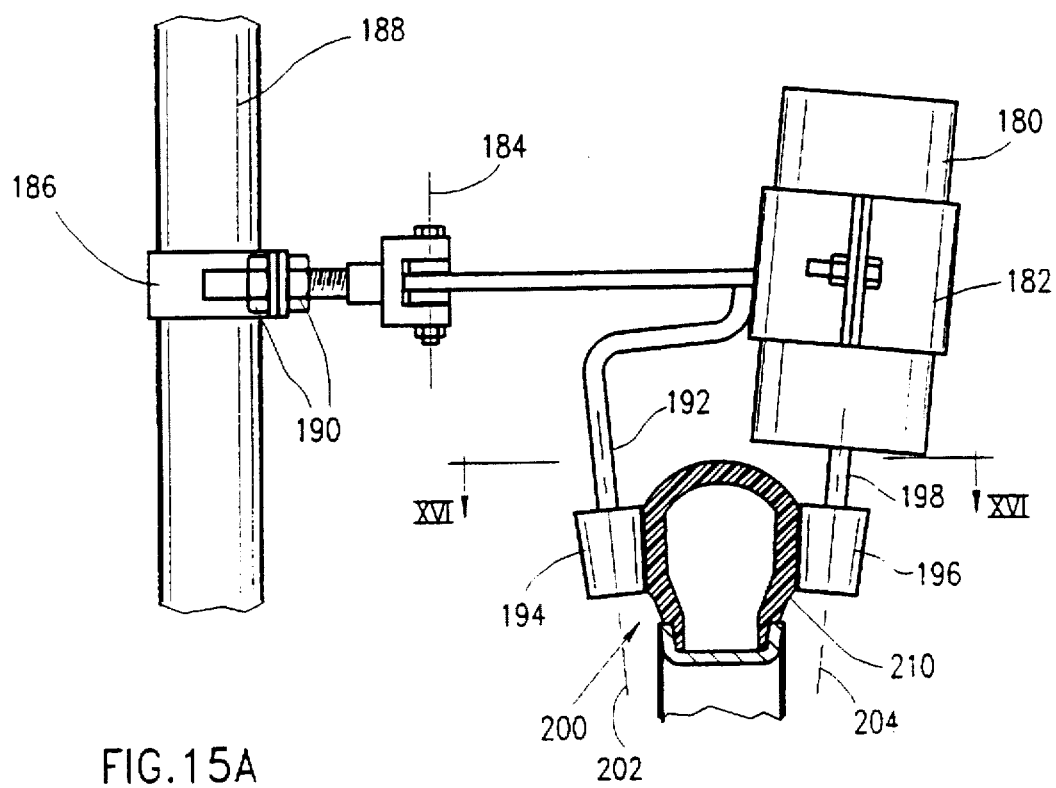

It is a particular feature of the present invention that when an increased load is applied to the wheel 26, impeding forward driven rotation of the wheel and causing its linear velocity to decrease as indicated by arrow 162, gear housing 152 tends to rotate as shown in FIG. 14B as the motor driven rotation of the wheel engagement elements 146 and 150 in frictional engagement with the wheel 26 causes them automatically to move into stronger frictional engagement with the wheel 26. In the illustrated embodiment, this is accomplished automatically by rotation of gear 144, shaft 148 and wheel engagement element 146 about the axis of shaft 140 in a direction indicated by an arrow 170.

As seen in FIG. 14B, this rotation brings the wheel engagement element 146 closer to wheel engagement element 150, thus increasing the squeezing force on the tire 48 and the traction between the motor 130 and the wheel 26. This rotation has the effect of causing the component of the separation between the first and second wheel engagement element rotation axes, i.e. of shafts 140 and 148, which lies parallel to the axis of rotation of the wheel, to decrease automatically with increased resistance to rotation of the wheel and increase automatically with decreased resistance to rotation of the wheel.

As a result, increased traction and increased power is provided automatically in self-regulating manner, when such traction and power is needed and only when needed.

Here, also the change in separation is clearly seen by comparing the perpendicular distance D between elements 146 and 150 in FIG. 14A with the perpendicular distance D–d in FIG. 14B.

It is noted that the gear arrangement illustrated in FIGS. 12–14B may be replaced by an equivalent transmission of another type, such as one including belts.

Reference is now made to FIGS. 15A, 15B, 16A and 16B, which illustrate another single motor auxiliary drive structure, particularly suitable for use in a wheelchair, in which a motor 180 is pivotably mounted by a bracket assembly 182, about a first pivot axis 184 onto a second bracket assembly 186, which is in turn fixedly mounted onto a generally upstanding shaft 188, as by bolts 190. Shaft 188 may form part of a wheelchair or other suitable vehicle.

Fixed to bracket assembly 182 is a support arm 192 which rotatably supports a dummy wheel engagement element 194, which is arranged at a fixed distance from a wheel engagement element 196, which is driven by an output shaft 198 of motor 180.

Preferably, in the illustrated embodiment, the wheel engagement elements 194 and 196 are generally conical rollers having high friction outer surfaces which frictionally and drivingly engage a wheel 200. Here, the respective pivot axes 202 and 204 of wheel engagement elements 194 and 196 are coplanar but non-parallel. Alternatively, pivot axes 202 and 204 may be selected to be parallel. In such a case, cylindrical rollers are used instead.

Figure 16A:
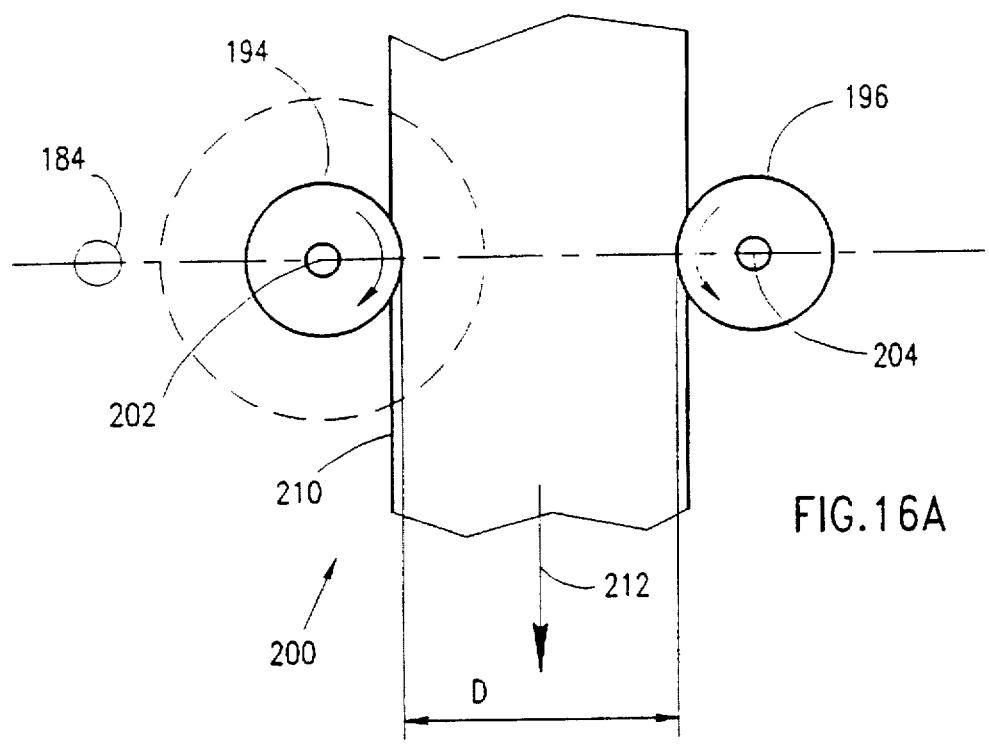
FIGS. 16A and 16B are simplified pictorial illustrations of the operation of the apparatus of FIGS. 15A and 15B in respective low load and high load situations, taken along lines XVI—XVI of FIG. 15A.

During steady state cruising operation of a wheelchair driven by motor 180, the arrangement of the wheel engagement elements 194 and 196 is generally as illustrated in FIG. 16A, wherein the wheel engagement elements 194 and 196 both deform the sides of the tire 210 and the relative linear velocity of the wheel is indicated by an arrow 212.

It is a particular feature of the present invention that when an increased load is applied to the wheel 200, impeding forward driven rotation of the wheel and causing its linear velocity to decrease as indicated by arrow 214, the motor driven rotation of the wheel engagement element 196 in frictional engagement with the wheel 200 causes both wheel engagement elements 194 and 196 to automatically move into stronger frictional engagement with the wheel 200. In the illustrated embodiment, this is accomplished automatically by rotation of bracket assembly 182, and thus of motor 180, arm 192 and wheel engagement elements 194 and 196 about pivot axis 184 in a direction indicated by an arrow 220.

Figure 16B:
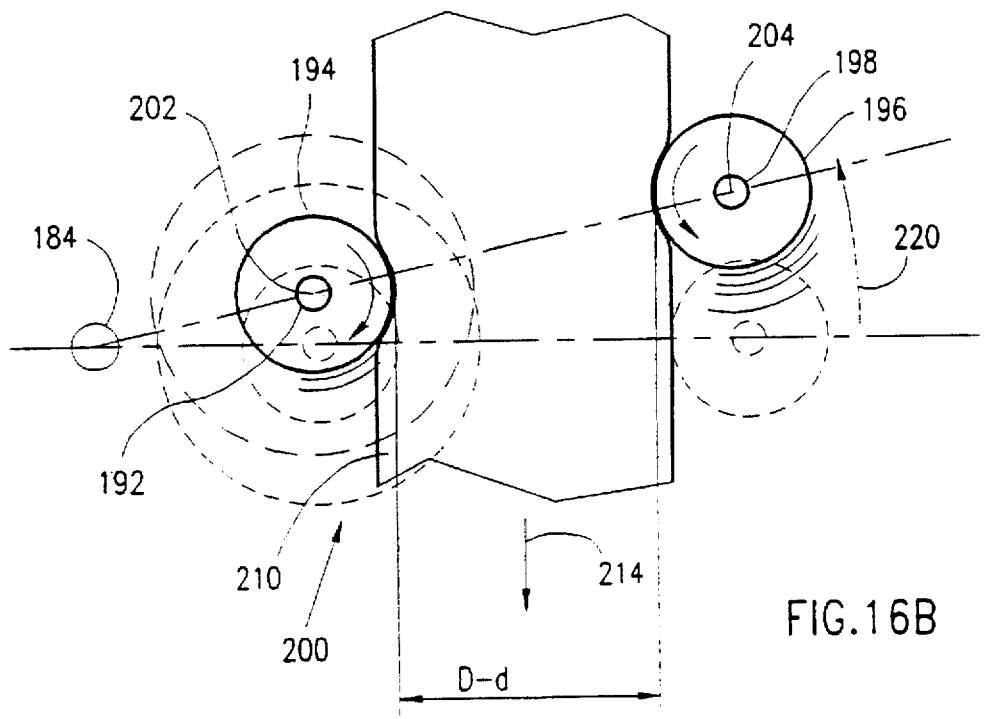

As seen in FIG. 16B, this rotation brings the wheel engagement elements 194 and 196 closer together across tire 210, thus increasing the squeezing force on the tire and the traction between the motor 180 and the wheel 200. This rotation has the effect of causing the component of the separation between the first and second wheel engagement element rotation axes, 202 and 204, which lies parallel to the axis of rotation of the wheel, to decrease automatically with increased resistance to rotation of the wheel and increase automatically with decreased resistance to rotation of the wheel.

As a result, increased traction and increased power is provided automatically in self-regulating manner, when such traction and power is needed and only when needed.

Figure 17:
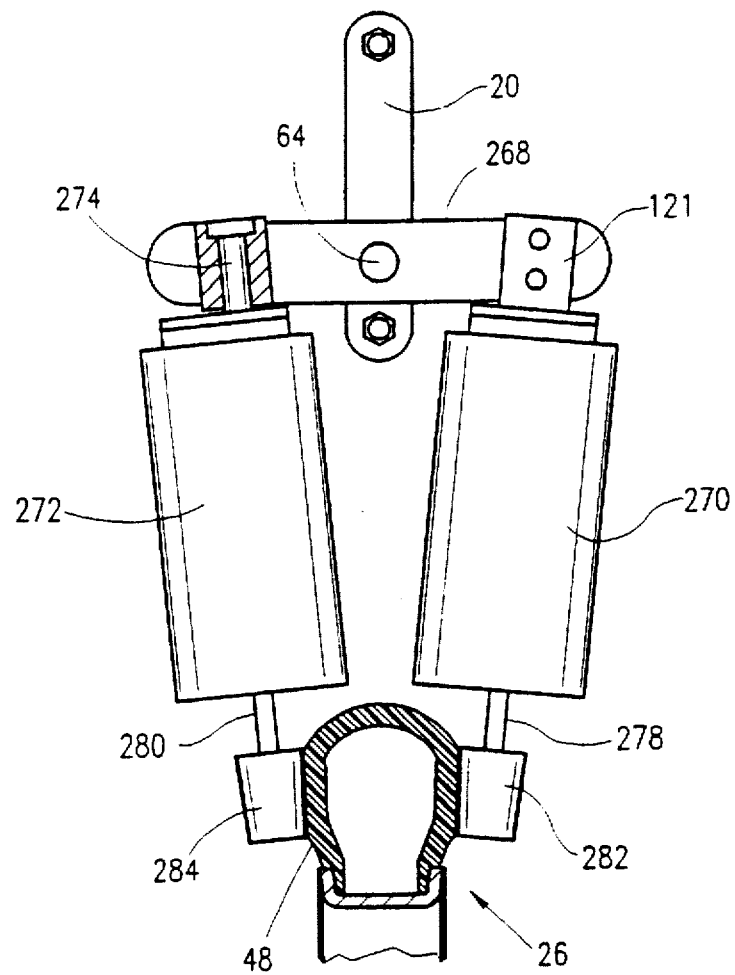
FIG. 17 is a partially cut away pictorial view of auxiliary drive apparatus constructed and operative in accordance with an additional preferred embodiment of the present invention in operative embodiment with a wheel.
Figure 18A:
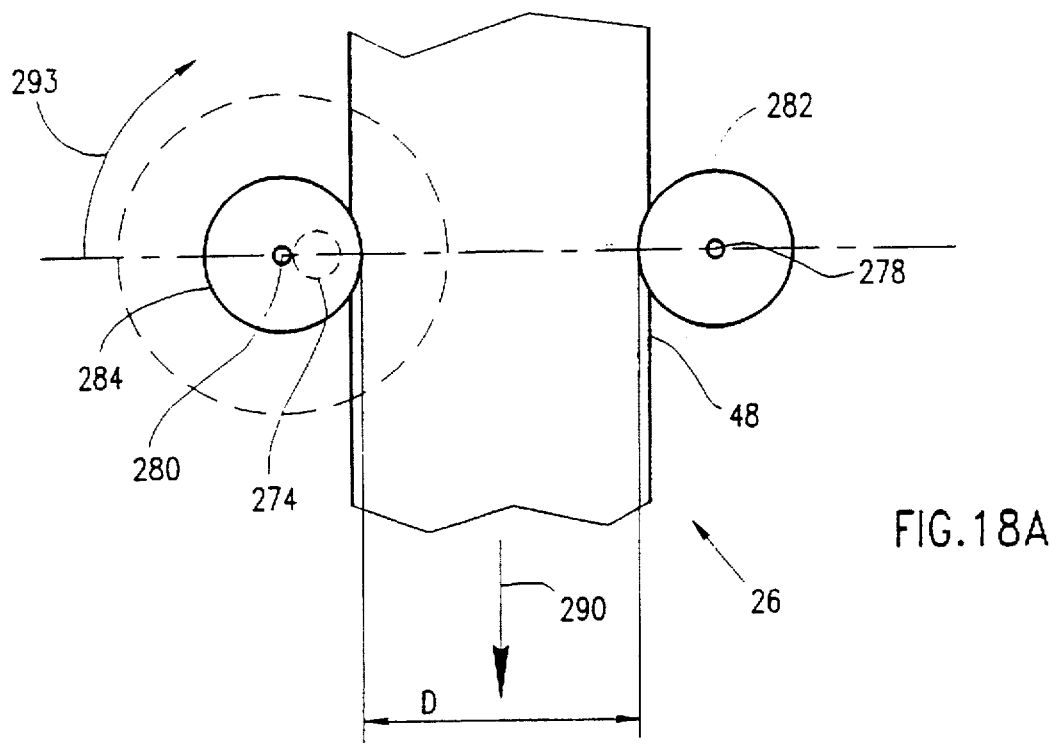
FIGS. 18A and 18B are simplified pictorial illustrations of the operation of the apparatus of FIG. 17 in respective low load and high load situations.
Figure 18B:
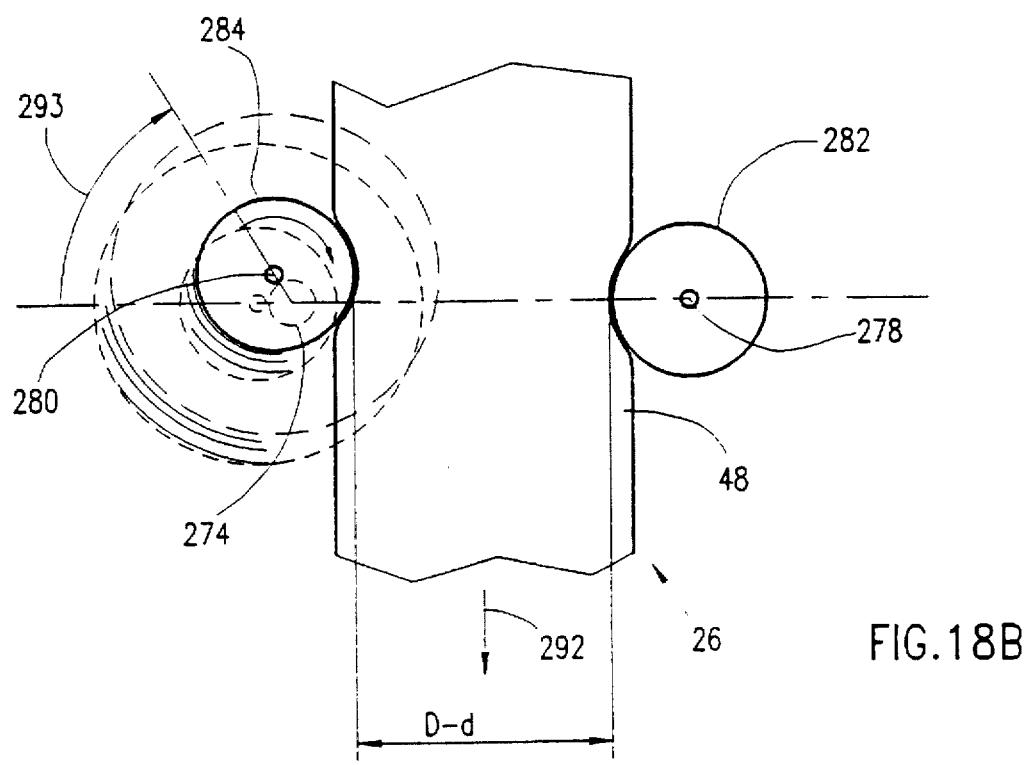

Reference is now made to FIGS. 17, 18A and 18B which illustrate auxiliary drive apparatus constructed and operative in accordance with an additional preferred embodiment of the present invention in operative engagement with a wheel. The apparatus of FIGS. 17, 18A and 18B is similar to that of FIGS. 10, 11A and 11B except that a different eccentric motor mounting and conical rollers are employed.

In the illustrated embodiment of FIGS. 17, 18A and 18B, motors 270 and 272 are mounted onto a base member 268 which is pivotably mounted onto a support element 20 about a pivot axis 64. Motor 270 is fixedly mounted onto base member 268, while motor 272 is pivotably and eccentrically mounted thereon about a pivot axis 274. Preferably, pivot axis 274 is perpendicular to pivot axis 64 and lie in a plane generally parallel to or coplanar with a plane in which lies the axis of rotation of the wheel 26.

Motors 270 and 272 have respective output shafts 278 and 280, onto which are mounted wheel engagement elements 282 and 284 respectively, of generally conical configuration. It is a particular feature of this embodiment that the wheel engagement element rotation axis defined by shaft 280 is not coaxial with pivot axis 274, although they are generally parallel. This eccentric mounting relationship provides an automatic traction adjustment feature similar to that provided by the mounting arrangement of FIGS. 10, 11A and 11B.

Preferably, in the illustrated embodiment, the wheel engagement elements 282 and 284 are generally conical rollers having high friction outer surfaces which frictionally and drivingly engage wheel 26. Alternatively, cylindrical rollers may be used instead when driven by mutually parallel drive shafts.

During steady state cruising operation of the bicycle driven by motors 270 and 272, the arrangement of the wheel engagement elements 282 and 284 is generally as illustrated in FIG. 18A, wherein the wheel engagement elements 82 and 84 both deform the sides of the tire 48 and the relative linear velocity of the wheel is indicated by an arrow 290.

It is a particular feature of the present invention that when an increased load is applied to the wheel 26, impeding forward driven rotation of the wheel and causing its linear velocity to decrease as indicated by arrow 292, the motor driven rotation of the wheel engagement element 284 in frictional engagement with the wheel 26 causes it to automatically move into stronger frictional engagement with the wheel 26. In the illustrated embodiment, this is accomplished automatically by rotation of each of motor 272 about pivot axis 274 in a direction indicated by arrow 293.

As seen in FIG. 18B, this rotation brings the wheel engagement elements 282 and 284 closer together, thus increasing the squeezing force on the tire 48 and the traction between the motors 270 and 272 and the wheel 26. This rotation has the effect of causing the component of the separation between the first and second wheel engagement element rotation axes, i.e. of shafts 278 and 280, which lies parallel to the axis of rotation of the wheel, to decrease automatically with increased resistance to rotation of the wheel and increase automatically with decreased resistance to rotation of the wheel.

As a result, increased traction and increased power is provided automatically in self-regulating manner, when such traction and power is needed and only when needed. By virtue of the pivotal mounting of base member 268 about pivot axis 64, the forces exerted on both sides of the wheel by elements 282 and 284 are generally equal.

Here, also, the change in separation is clearly seen by comparing the perpendicular distance D between elements 282 and 284 in FIG. 18A with the perpendicular distance D–d in FIG. 18B.

Figure 19:
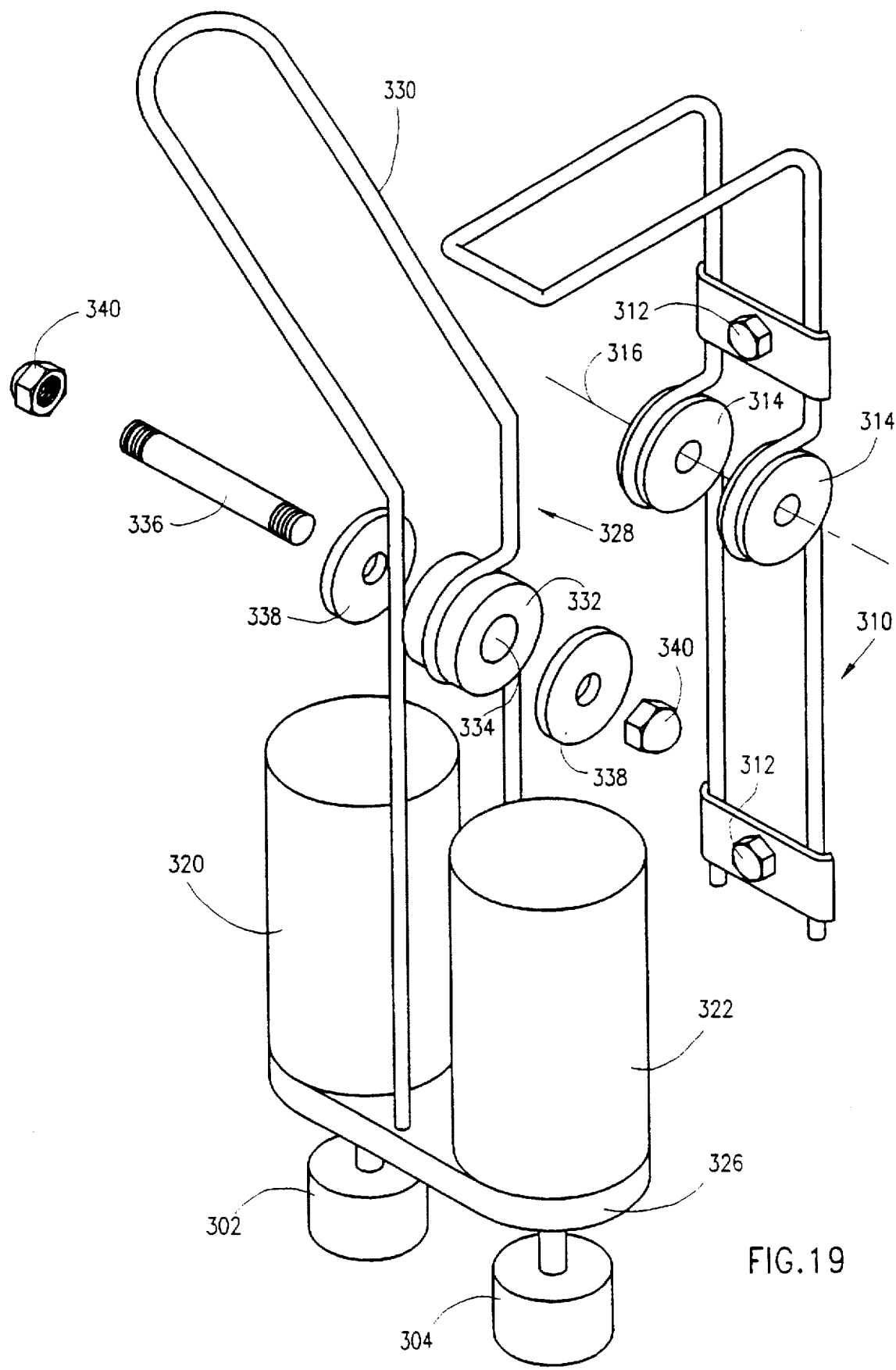
FIG. 19 is an exploded view illustration of yet another preferred embodiment of the present invention.
Figure 20:
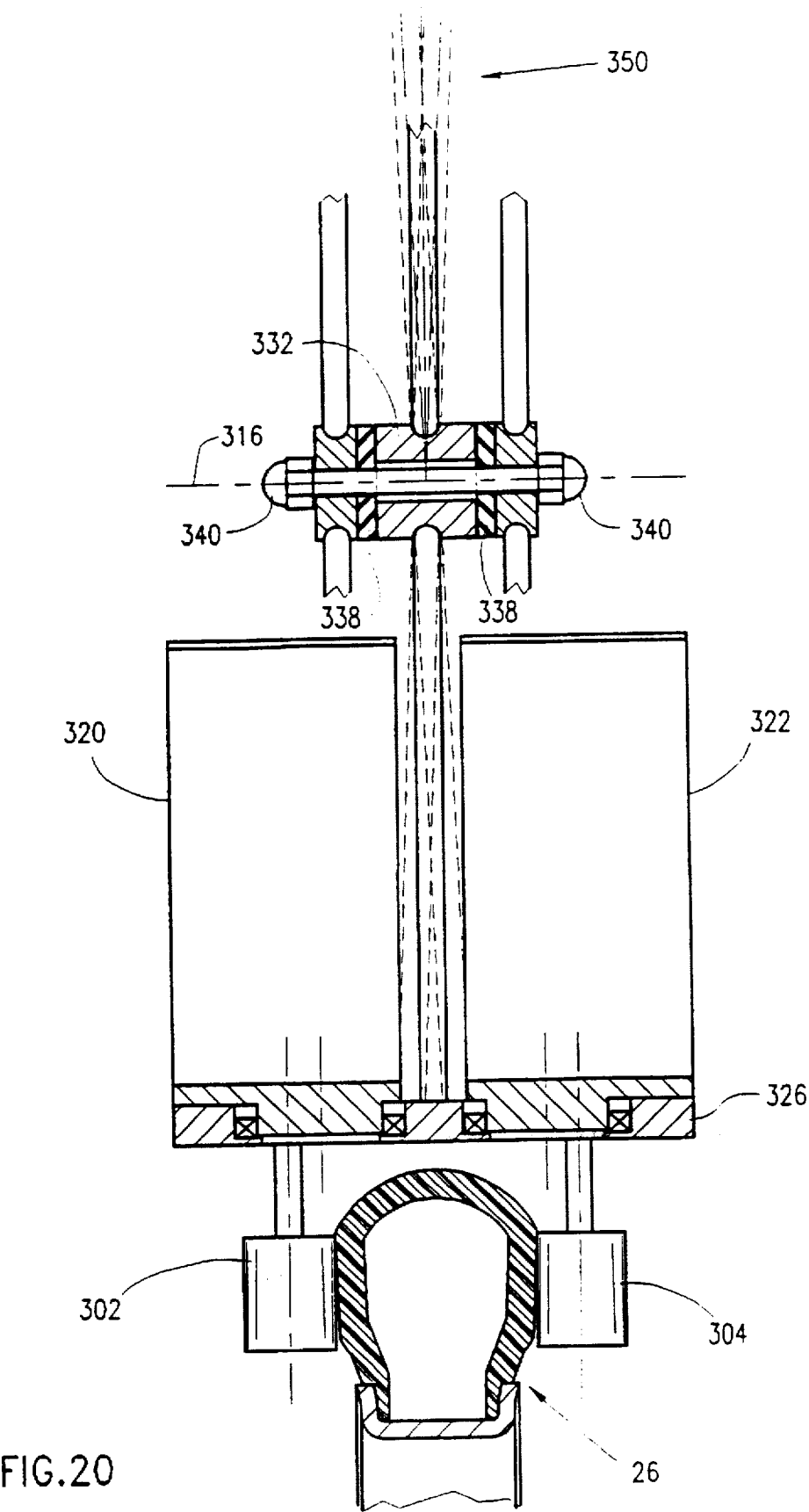
FIG. 20 is an illustration of the apparatus of FIG. 19 in operative engagement with a wheel.

Reference is now made to FIGS. 19 and 20 which illustrate yet another preferred embodiment of the present invention. The drive apparatus and its general operation may be generally the same as any of the above-described embodiments, notwithstanding that the apparatus shown is most similar to that illustrated in FIG. 6.

In the embodiment of FIGS. 19 and 20, a pivot assembly is provided which is sufficiently loose not only to permit manual pivoting of the auxiliary drive apparatus into and out of wheel engagement, but also to permit pivoting of the auxiliary drive apparatus about a pivot axis which is the equivalent of pivot axis 64, described hereinabove, whereby the forces exerted on both sides of the wheel by wheel engagement elements 302 and 304 are generally equal and wheel eccentricities are accommodated.

As seen in FIG. 19, a support bracket assembly 310 may be mounted onto a bicycle by means of bolts 312 and includes a pair of bushings 314 which define a pivot axis 316 which may be considered to be equivalent to the pivot axis 15 in the embodiment of FIG. 1C described hereinabove.

Motors 320 and 322 are pivotably and eccentrically mounted in the general manner of FIG. 6 onto a mounting element 326, which is in turn supported onto a manually rotatable bracket assembly 328. Manually rotatable bracket assembly 328 includes a handle portion 330 which is preferably fixedly attached to mounting element 326 and which has fixedly associated therewith a bushing 332 having a bore 334 e tending therethrough. A bolt 336 and associated washers 338 and nuts 340 pivotably mount bracket assembly onto support bracket assembly 310 for rotation about axis 316, to permit manual pivotal rotation of the wheel engagement elements 302 and 304 into and out of driving engagement with wheel 26.

It is a particular feature of the embodiment of FIGS. 19 and 20 that the pivotal engagement of bracket assembly 328 and support bracket assembly 310 is sufficiently loose, so that it permits limited but sufficient pivoting about an axis extending perpendicular to axis 316, which provides the functionality realized by pivotal mounting about pivot axis 64 in the embodiments described hereinabove, i.e. equalization of forces on both sides of the wheel and taking into account wheel eccentricities. This additional pivoting is illustrated by the phantom lines indicated by reference numeral 350 in FIG. 20.

In the illustrated embodiment the desired looseness is realized by making bore 334 of a sufficiently larger diameter than the outer diameter of bolt 336. It is appreciated that other structures may be employed to obtain an equivalent result.

It will be appreciated by persons skilled in the art that the present invention is not limited by what has been particularly shown and described hereinabove. Rather the scope of the present invention is defined only by the claims which follow:

We claim:

1. Auxiliary drive apparatus comprising:

a wheel having an axis of rotation; and first and second wheel engagement elements arranged for driving engagement with said wheel, at least one of the wheel engagement elements being coupled to a motor, for being driven thereby, said first and second of wheel engagement elements being arranged for rotation about respective first and second engagement element rotation axes, said first and second wheel engagement elements being mounted such that the effective traction of the engagement thereof with the wheel increases automatically with increased resistance to rotation of the wheel and decreases automatically with decreased resistance to rotation of the wheel;

and wherein a mounting of said first and second wheel engagement elements is such that a separation between the first and second wheel engagement element rotation axes, said separation lying parallel to the axis of rotation of the wheel, is variable.

2. Auxiliary drive apparatus according to claim 1 and wherein the separation between the first and second wheel engagement element rotation axes decreases automatically with increased resistance to rotation of the wheel and increases automatically with decreased resistance to rotation of the wheel.

3. Auxiliary drive apparatus according to claim 1 and wherein at least one of said wheel engagement elements is pivotably mounted, together with the motor, about a pivot axis which is generally parallel to the first and second wheel engagement element rotation axes.

4. Auxiliary drive apparatus according to claim 3 and wherein a non-motor driven engagement element is also arranged for rotation about said pivot axis.

5. Auxiliary drive apparatus according to claim 1 and wherein only one of the wheel engagement elements is motor driven.

6. Auxiliary drive apparatus according to claim 5 and wherein a non-motor driven wheel engagement element is fixed with respect to said motor-driven wheel engagement element and is pivotably mounted together therewith.

7. Auxiliary drive apparatus according to claim 5 and wherein a non-motor driven wheel engagement element has a rotation axis which is pivotable only about one axis, which axis lies in a plane of the wheel.

8. Auxiliary drive apparatus according to claim 1 and wherein said first and second wheel engagement elements are coupled by a transmission.

9. Auxiliary drive apparatus according to claim 1 and wherein said first and second wheel engagement elements are pivotably mounted about a pivot axis which lies in a plane of the wheel.

10. Auxiliary drive apparatus according to claim 1 and wherein increased traction and increased power is provided automatically in self-regulating manner, when such traction and power is needed and only when needed.

11. Auxiliary drive apparatus according to claim 1 and wherein said first and second wheel engagement elements are mounted for pivotable rotation about an axis which extends generally perpendicularly to said axis of rotation of said wheel.

12. Auxiliary drive apparatus comprising:

a wheel having an axis of rotation; and first and second wheel engagement elements arranged for driving engagement with said wheel, at least one of the wheel engagement elements being coupled to a motor, for being driven thereby, said first and second of wheel engagement elements being arranged for rotation about respective first and second engagement element rotation axes, said first and second wheel engagement elements being mounted such that the effective traction of the engagement thereof with the wheel increases automatically with increased resistance to rotation of the wheel and decreases automatically with decreased resistance to rotation of the wheel;

and wherein said motor is pivotally mounted on a base member about a motor pivot axis, and said motor pivot axis is located nearer to the wheel than both of the wheel engagement element rotation axes of the wheel engagement elements.

13. Auxiliary drive apparatus according to claim 12 and wherein said wheel engagement element rotation axes are generally parallel to but not coaxial with said motor pivot axis.

* * * * *